United States Patent
Robinson et al.

(10) Patent No.: US 10,427,765 B2
(45) Date of Patent: Oct. 1, 2019

(54) MOTOR CONTROL SYSTEM BASED UPON MOVEMENTS INHERENT TO SELF-PROPULSION

(71) Applicant: Medici Technologies, LLC, Albuquerque, NM (US)

(72) Inventors: Mark Ries Robinson, Albuquerque, NM (US); Elena A Allen, Albuquerque, NM (US)

(73) Assignee: Medici Technologies, LLC, Albuquerque, NM (US)

( * ) Notice: Subject to any disclaimer, the term of this patent is extended or adjusted under 35 U.S.C. 154(b) by 14 days.

(21) Appl. No.: 15/681,163

(22) Filed: Aug. 18, 2017

(65) Prior Publication Data
US 2018/0050769 A1 Feb. 22, 2018

Related U.S. Application Data

(60) Provisional application No. 62/376,878, filed on Aug. 18, 2016.

(51) Int. Cl.
| | | |
|---|---|---|
| *H02K 7/18* | (2006.01) | |
| *B63B 35/79* | (2006.01) | |
| *G06F 3/01* | (2006.01) | |
| *B63H 21/21* | (2006.01) | |
| *G06F 3/0346* | (2013.01) | |

(52) U.S. Cl.
CPC ......... *B63B 35/7943* (2013.01); *B63H 21/21* (2013.01); *G06F 3/014* (2013.01); *G06F 3/017* (2013.01); *G06F 3/0346* (2013.01)

(58) Field of Classification Search
CPC ...... B63B 35/7943; B63H 21/21; G06F 3/017
See application file for complete search history.

(56) References Cited

U.S. PATENT DOCUMENTS

| | | | | |
|---|---|---|---|---|
| 5,832,440 | A * | 11/1998 | Woodbridge | B63H 20/007 704/275 |
| 2008/0132127 | A1 * | 6/2008 | Jansen | B63B 35/73 440/1 |
| 2016/0198088 | A1 * | 7/2016 | Wang | H04N 5/23238 348/36 |

* cited by examiner

*Primary Examiner* — Muhammad S Islam
(74) *Attorney, Agent, or Firm* — V Gerald Grafe

(57) ABSTRACT

The systems and methods described herein provide hands free motor control mechanisms based on the natural and inherent movements associated with an activity of interest, and can be combined with gesture communication based upon defined movements by the participant.

22 Claims, 18 Drawing Sheets

MOTOR CONTROL SYSTEM BASED UPON MOVEMENTS INHERENT TO SELF-PROPULSION

CROSSREFERENCE TO RELATED APPLICATIONS

Figure 1:
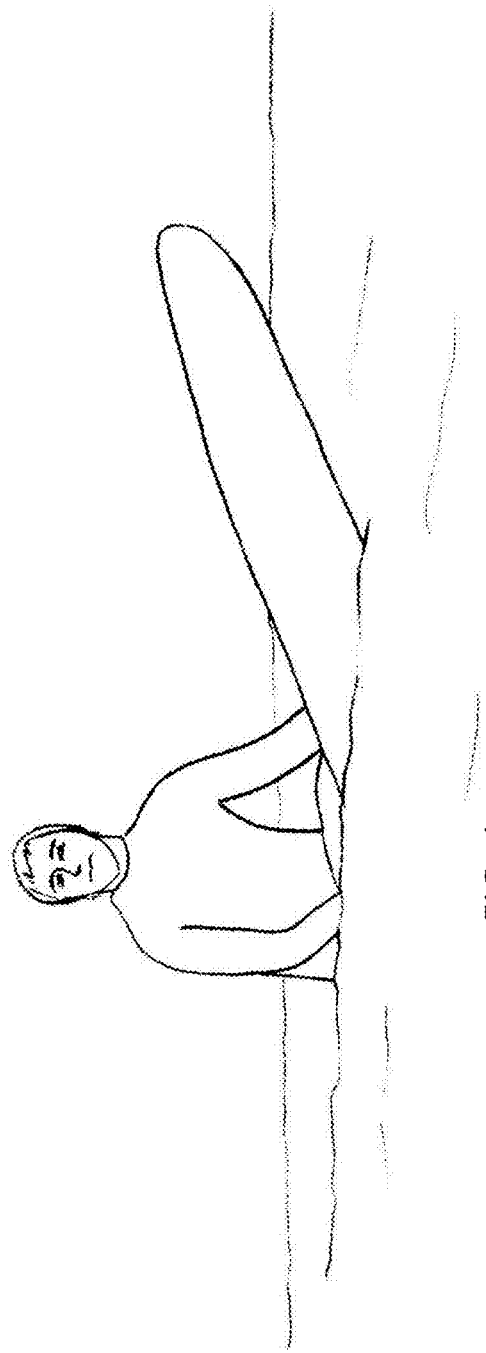

This application claims priority to U.S. provisional 62/376,878, filed Aug. 18, 2016, which is incorporated herein by reference.

BACKGROUND INFORMATION

Developments in smaller and more powerful motors have created a variety of motor assisted devices including skateboards, surfboards, kayaks and other human movement devices. However, these devices are controlled by throttle mechanisms that require participant interaction and can undermine the participant experience.

Consider the act of surfing. The activity of surfing involves the participant or surfer lying face down on a board and paddling out past the area where the majority of waves are breaking. The surfer then typically waits until an appropriate wave begins to approach. At this junction, the surfer aligns the board toward the shore as the wave begins to crest in an effort to "catch" the wave. If the surfer is successful in catching the wave, the surfer is pushed by the wave toward the shore and is able to perform a variety of maneuvers on the wave. The process is typically repeated multiple times over a surf session.

Although the above process sounds moderately easy, the process can be exceptionally tiring because paddling out through the wave is fatiguing. The process of catching the wave is also demanding, as the surfer must get the board moving prior to the wave cresting; otherwise, the surfer will be unsuccessful in catching the wave. For the average person, the padding difficulties and fatigue associated with the process are major barriers to enjoying the sport of surfing and limit the duration most people can surf. Although a motor assisted surfboard has been developed, the user experience remains sub-optimal due to the need to start and stop motor assist by punching buttons on a wrist based control device.

SUMMARY OF INVENTION

The ability to have the level of motor assistance controlled through the inherent movements of the activity would create an enhanced user experience in activities such as surfing.

The systems and methods described herein provide hands free motor control mechanisms based on the natural and inherent movements associated with an activity of interest, and can be combined with gesture communication based upon defined movements by the participant. An example motor control system creates an enhanced activity experience by providing the participant with motor assistance via a control system that does not require an intentional action that is not intuitively connected with the activity. For example, when participating in the activity, the individual does not have to adjust a throttle, hold a control device, push buttons, or physically interact with a control system. In practice, the system leverages intuitive and natural motions to control the motor for an enhanced user experience. Example activities that can benefit form the present invention include surfing, standup paddle board, canoeing, kayaking, skate boarding, scootering, inline skating and other activities that can be benefited by motor assistance. The motor control system is based upon the physical motions of the participant as measured by one or more of (1) kinematic sensors, which may include accelerometers, gyroscopic meters, and magnetometers, (2) optical systems using vision-based activity recognition, or (3) a combination of the previously mentioned systems.

In use, the system effectively identifies a signal associated with the activity for use in motor control, while minimizing the contribution from noise associated with non-activity related signals or information due to changes in the environment. Due to the physical movement of the individual involved in the activity, the participant's environment and background scene can be constantly changing and create noise artifacts that can complicate the task of identifying the signal desired for control. Example embodiments of the present invention effectively manage and minimize such artifacts and provide a quality control mechanism that creates the desired participant experience and is also safe to operate. Example embodiments incorporate a variety of environmental noise mitigation methods for improved performance of the system.

Because safe operation is very important, example embodiments can use the fact that some activities require a specific sequence of events. For example, in surfing, the pop-up to a standing position is preceded by a paddling period. Independently or in combination, the system can use the activity state of the participant as a necessary feature of the activation of motor assistance. For example, assistance with paddling can be predicated on determination that the participant be in a paddling position on the board.

The use of gesture communication can further enhance the participant experience and overall operation by enabling additional motor assistance control during defined activities. Such gesture communication can also be used to stop the motor in defined conditions. For example, when surfing a wave, the participant may want additional assistance as the wave is "petering out" but due to shore conditions a second wave is available. In such cases, the user can inform the motor control system to add more assistance through defined gestures.

As a final control mechanism, the system can also interpret and utilize voice commands. As is the case with other control systems, management of background noise or elimination of non-desired motor assistance is desired. Thus, the system can employ a user defined wake-up word or phrase prior to accepting and executing the command. For example, the wake phrase can be defined as "Assist System." The user can then state "Assist System, stop".

Physical motions of the participant performing the activity can be captured by sensors. For example, one or more motion sensors can be placed within the paddles for activities such as kayaking, stand-up paddle board or canoeing. Sensors can also be placed on the participant to capture the cadence of the activity. Additional sensors can be placed on a water craft, wheeled device board, or body of the participant to capture motions related to environmental noises that are unrelated to the activity. The motion data is then processed to control the level of assistance based upon both type of activity and the intensity of the activity. In practice, a watch or similar device containing an Inertial Measurement Unit (IMU) can collect the data that is to be subjected to subsequent processing for activity state, activity cadence or rate, and combinations thereof. The resulting information can then be converted into a motor assistance or control levels that are communicated to the motor.

The activity state as well as the cadence of the activity can also be determined by vision-based activity recognition methods. Vision-based human action recognition is the process of determining an activity based upon an image or series of images. Additionally, the rate of the activity or intensity can be determined by the examination of image sequences. The vision-based activity recognition can be done by currently available image capture systems as well as 3D cameras.

The system and methods disclosed herein create an improved participant experience by enabling the participant to control an assistance device or motor that creates an enhanced user experience in an intuitive manner based upon movements inherent to participation in the activity.

BRIEF DESCRIPTION OF FIGS.

Figure 2:
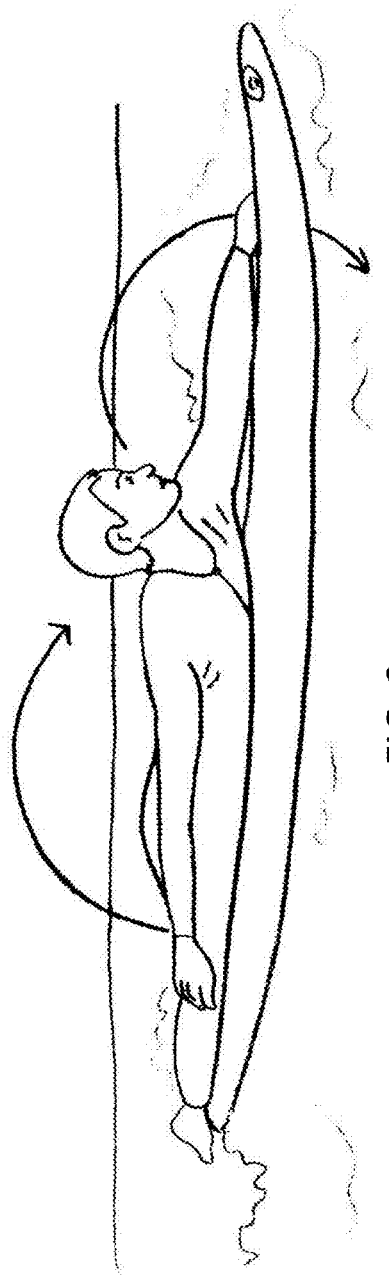
Figure 3:
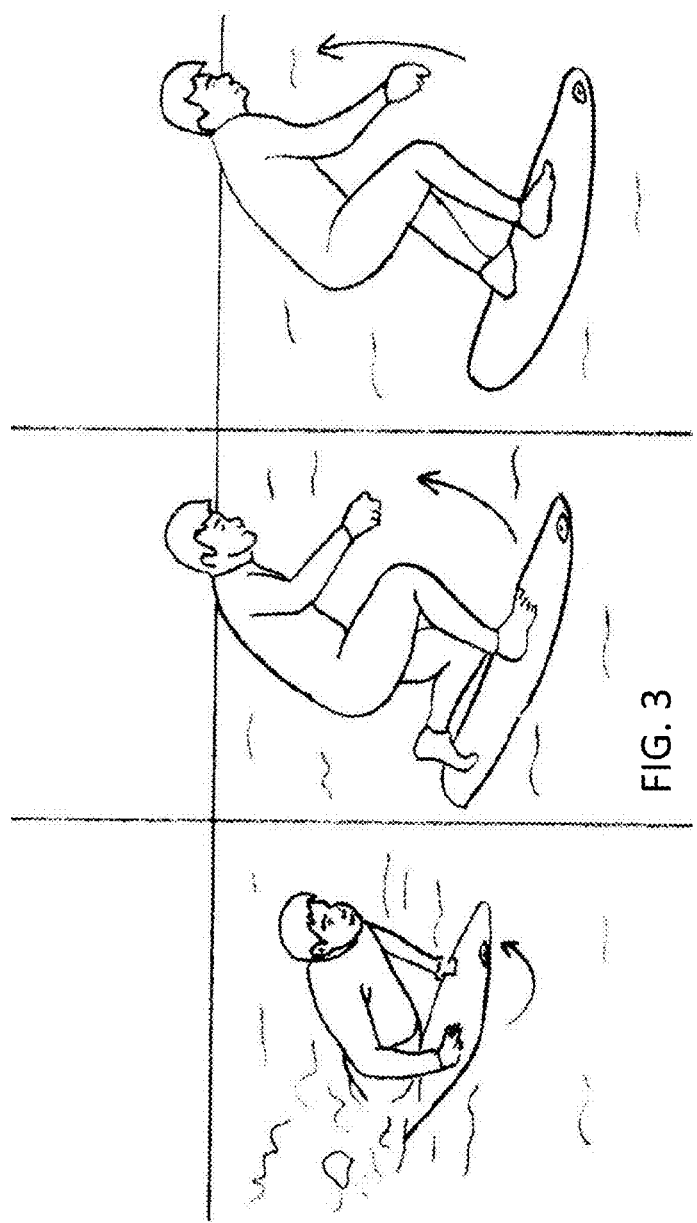
Figure 4:
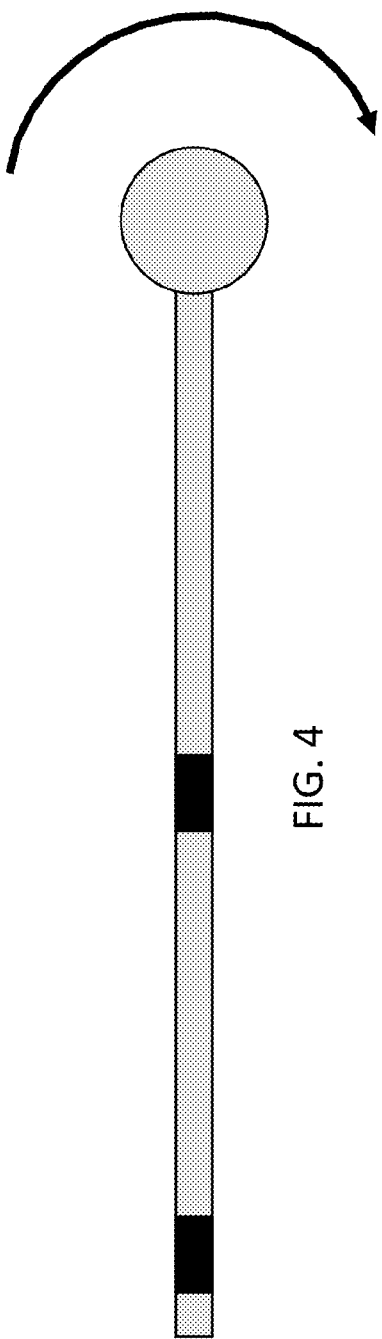
Figure 5:
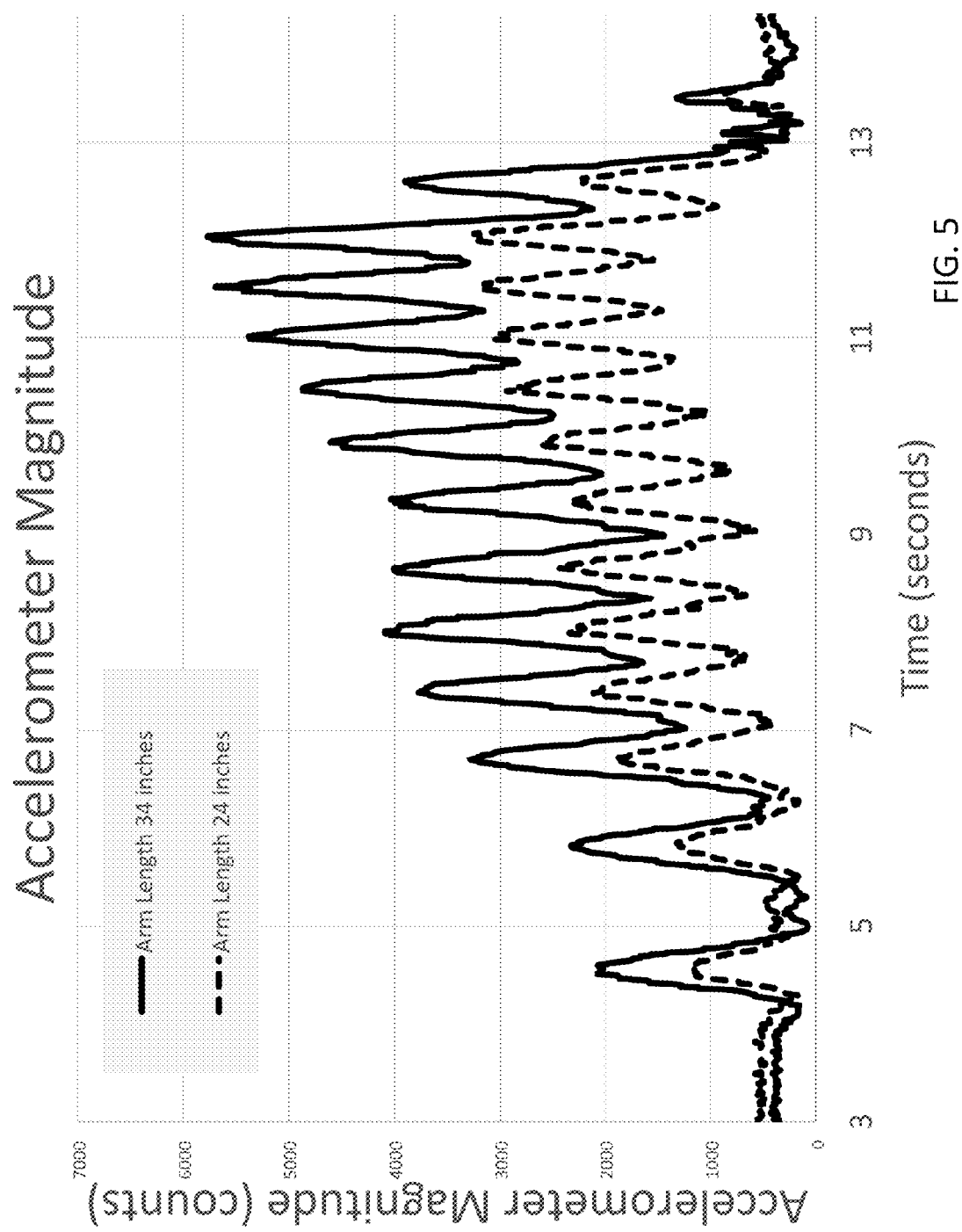
Figure 6:
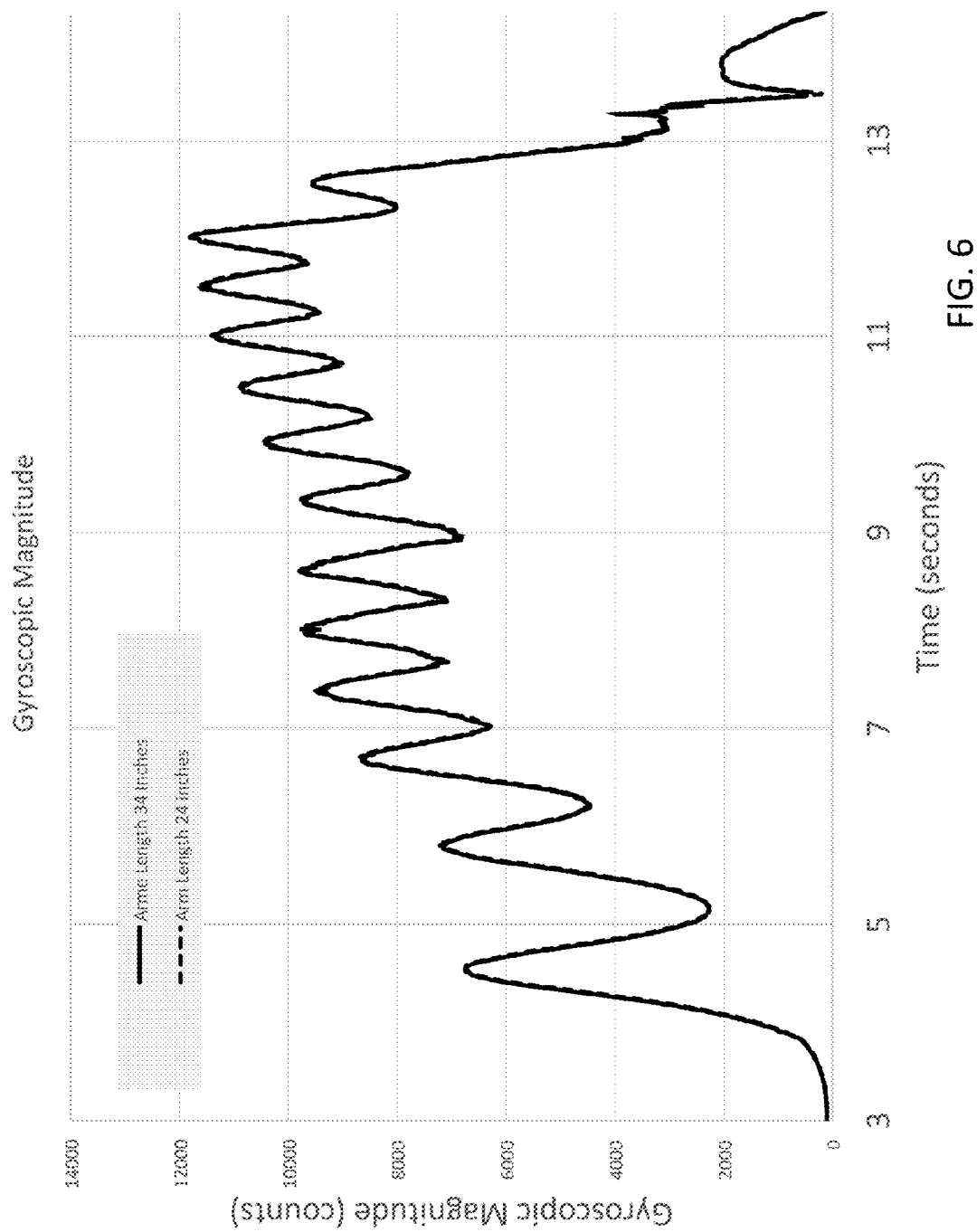
Figure 7:
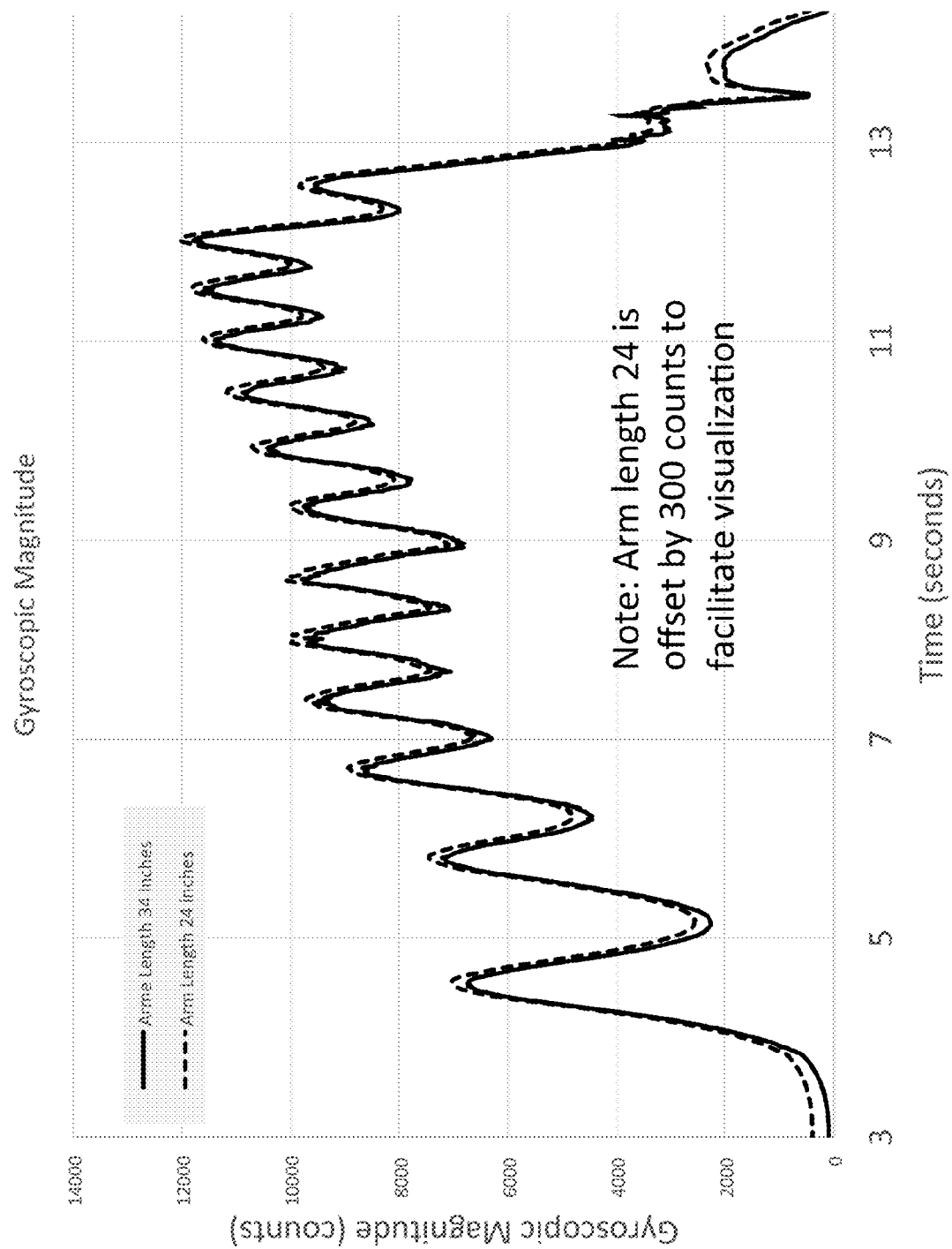
Figure 8:
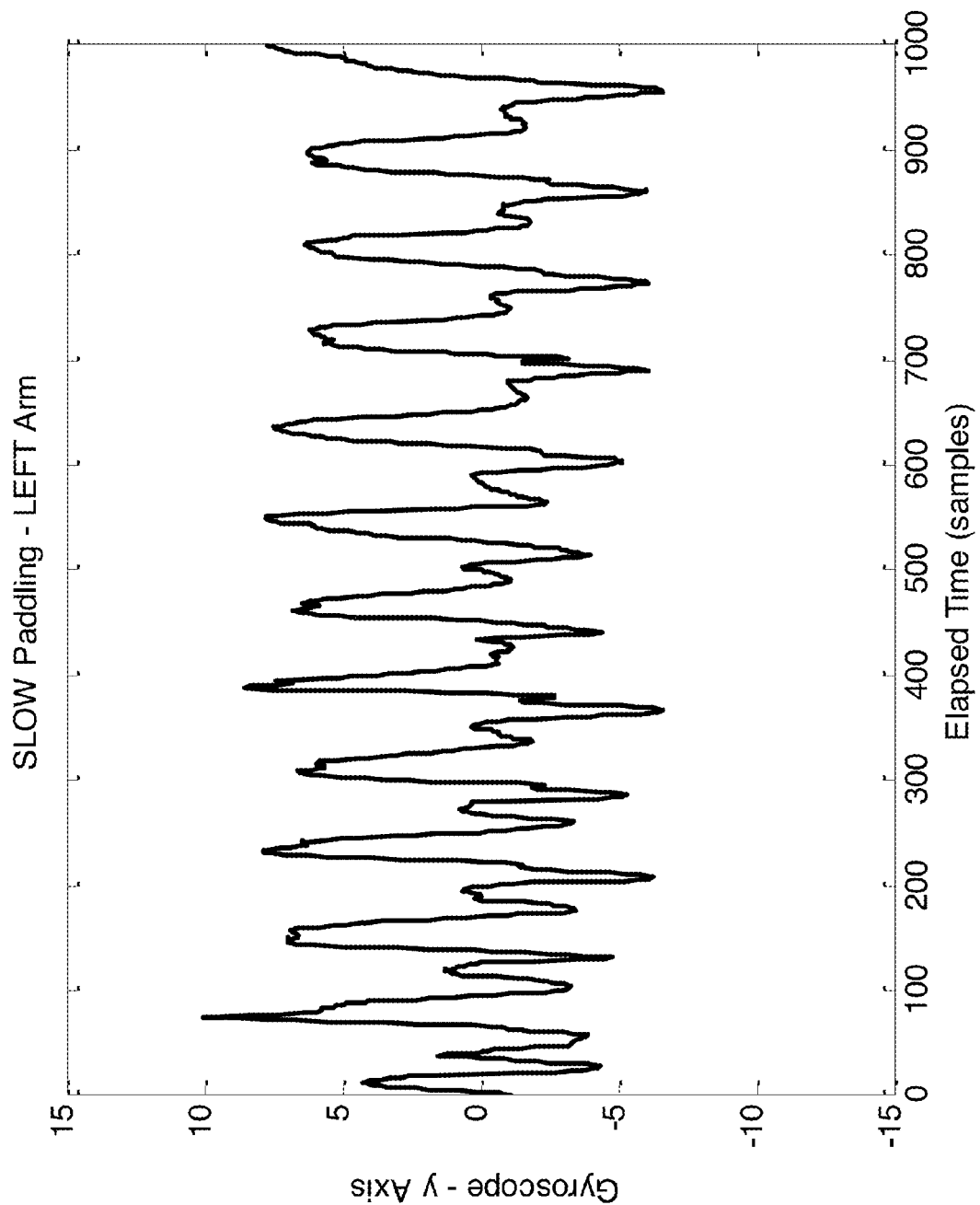
Figure 9:
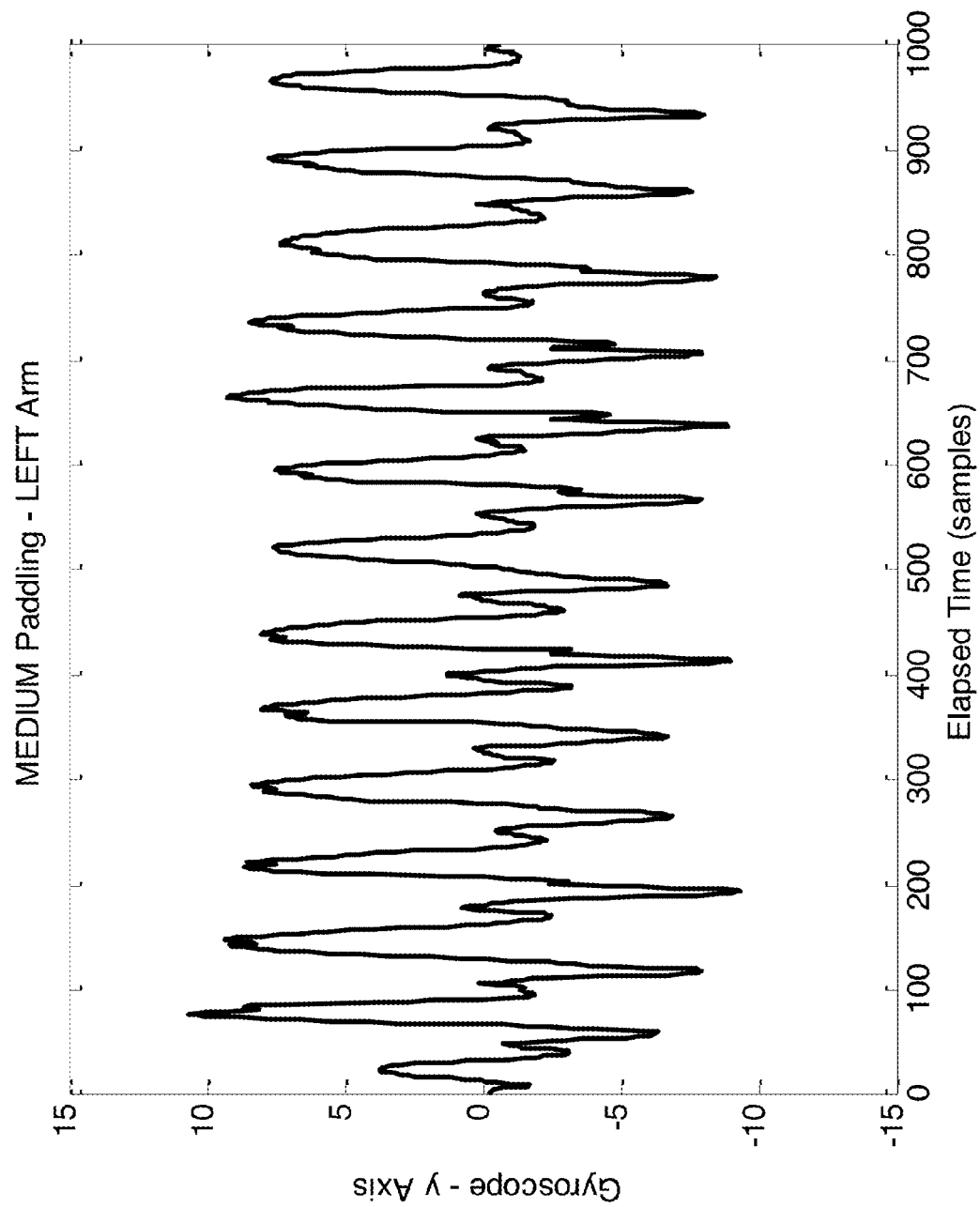
Figure 10:
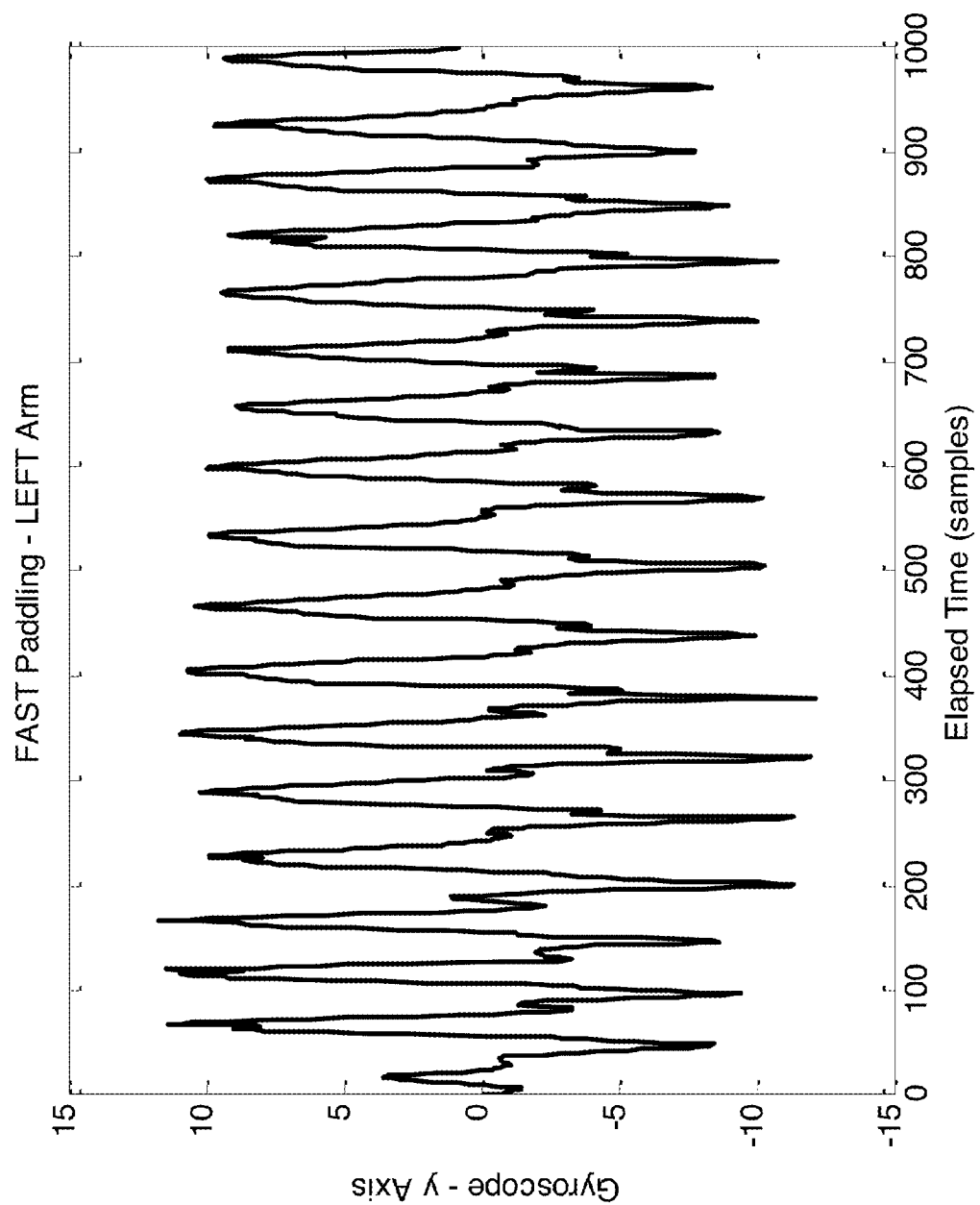
Figure 11:
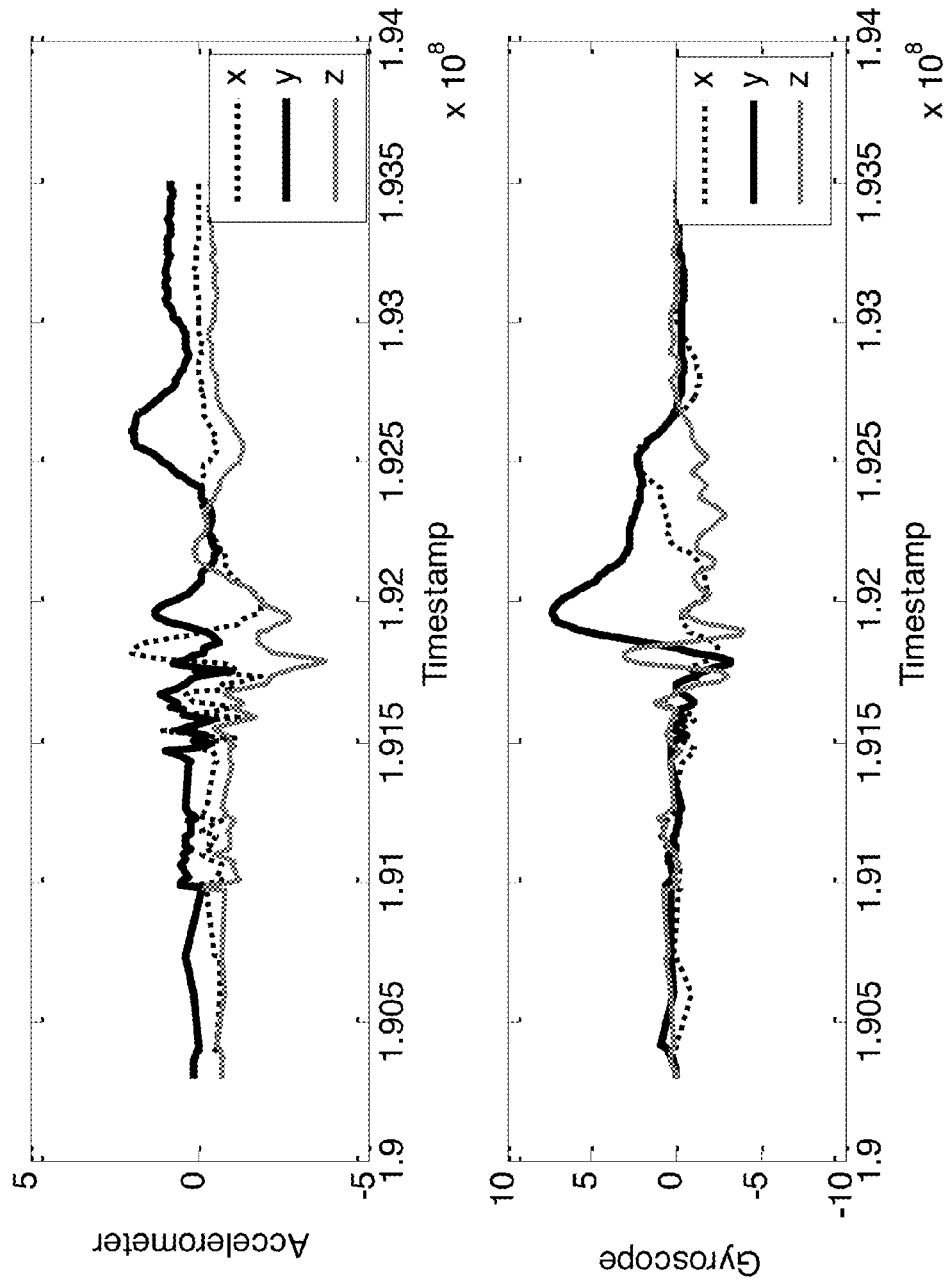
Figure 12:
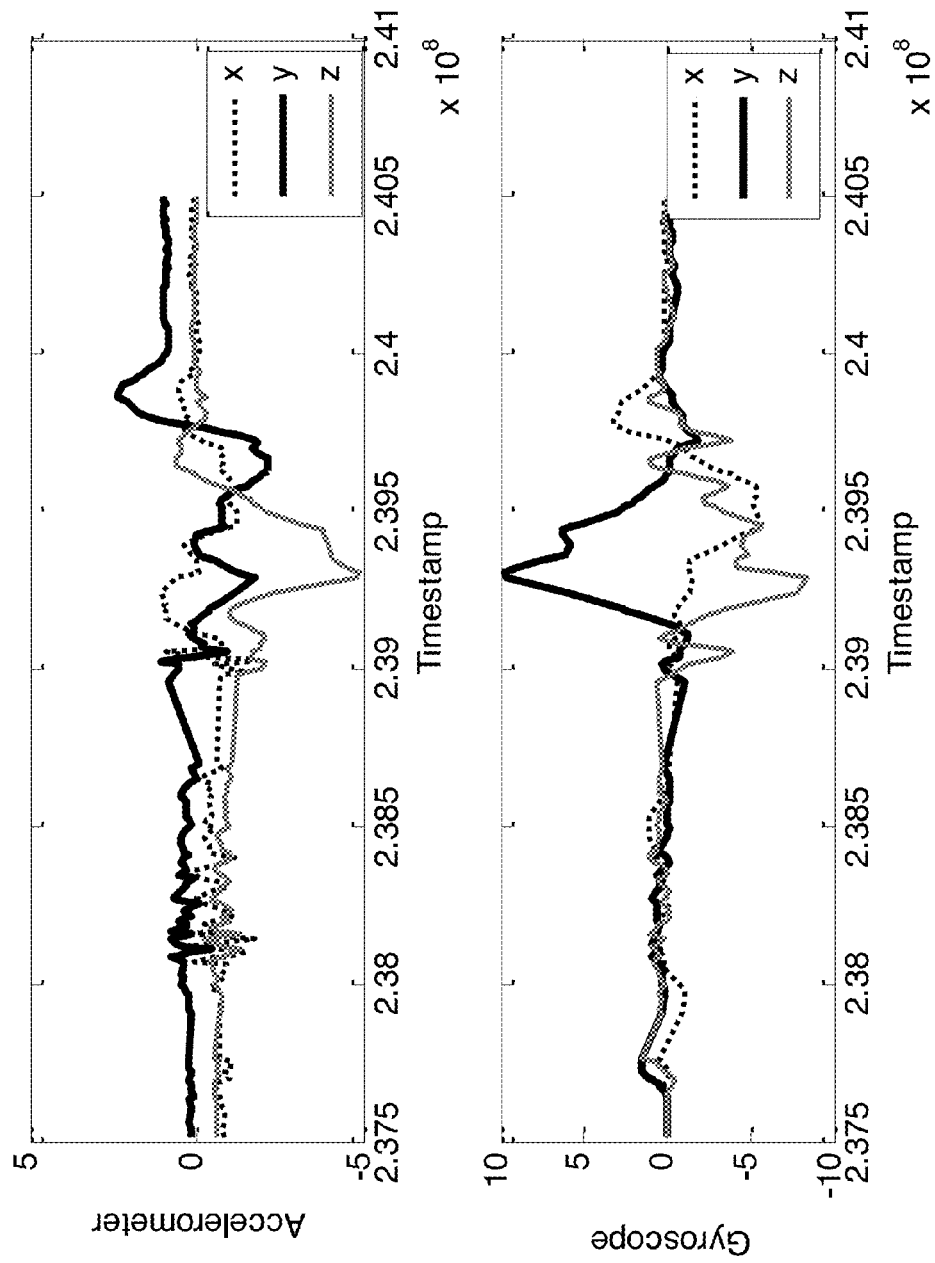
Figure 13:
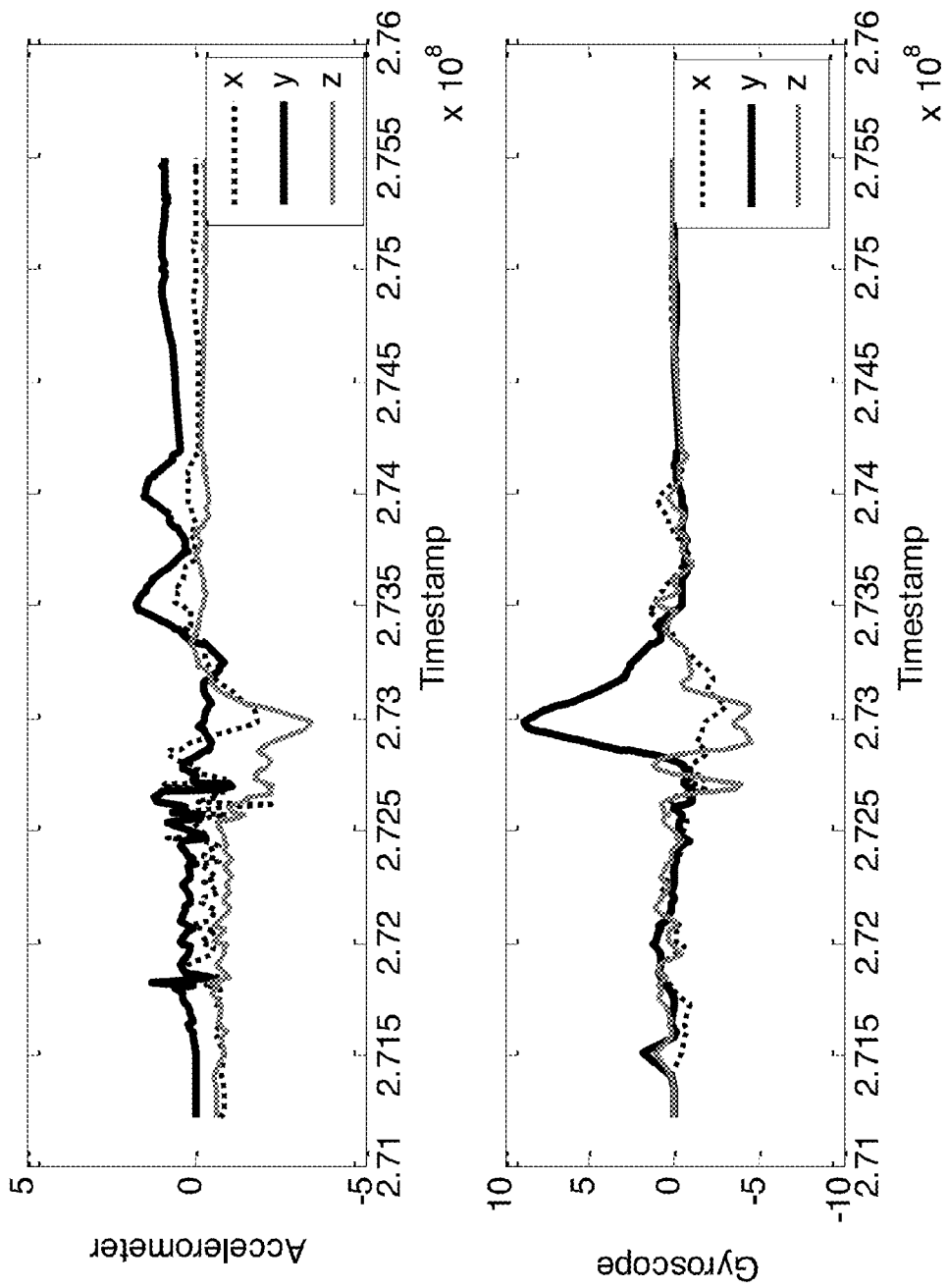
Figure 14:
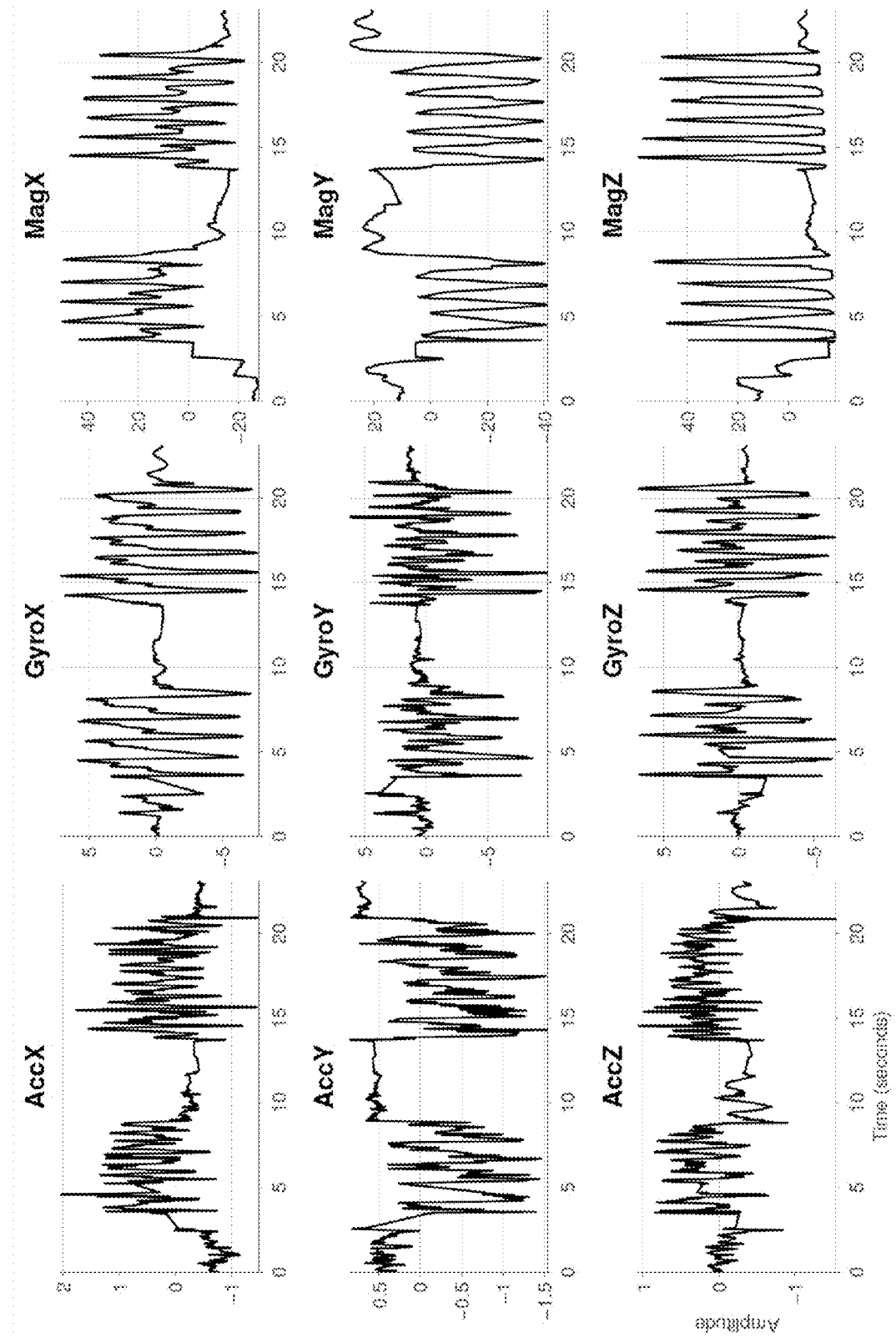
Figure 15:
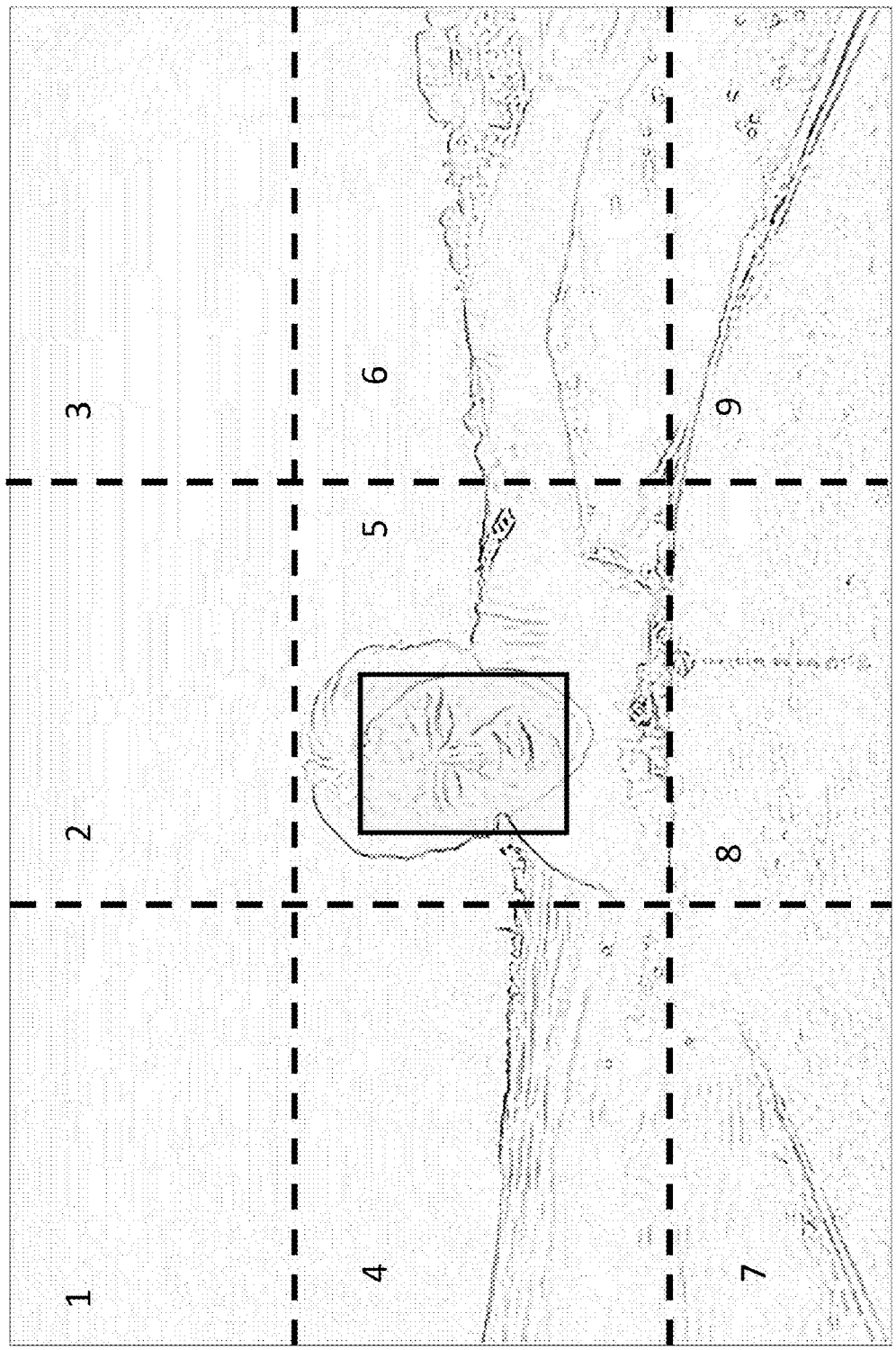
Figure 16:
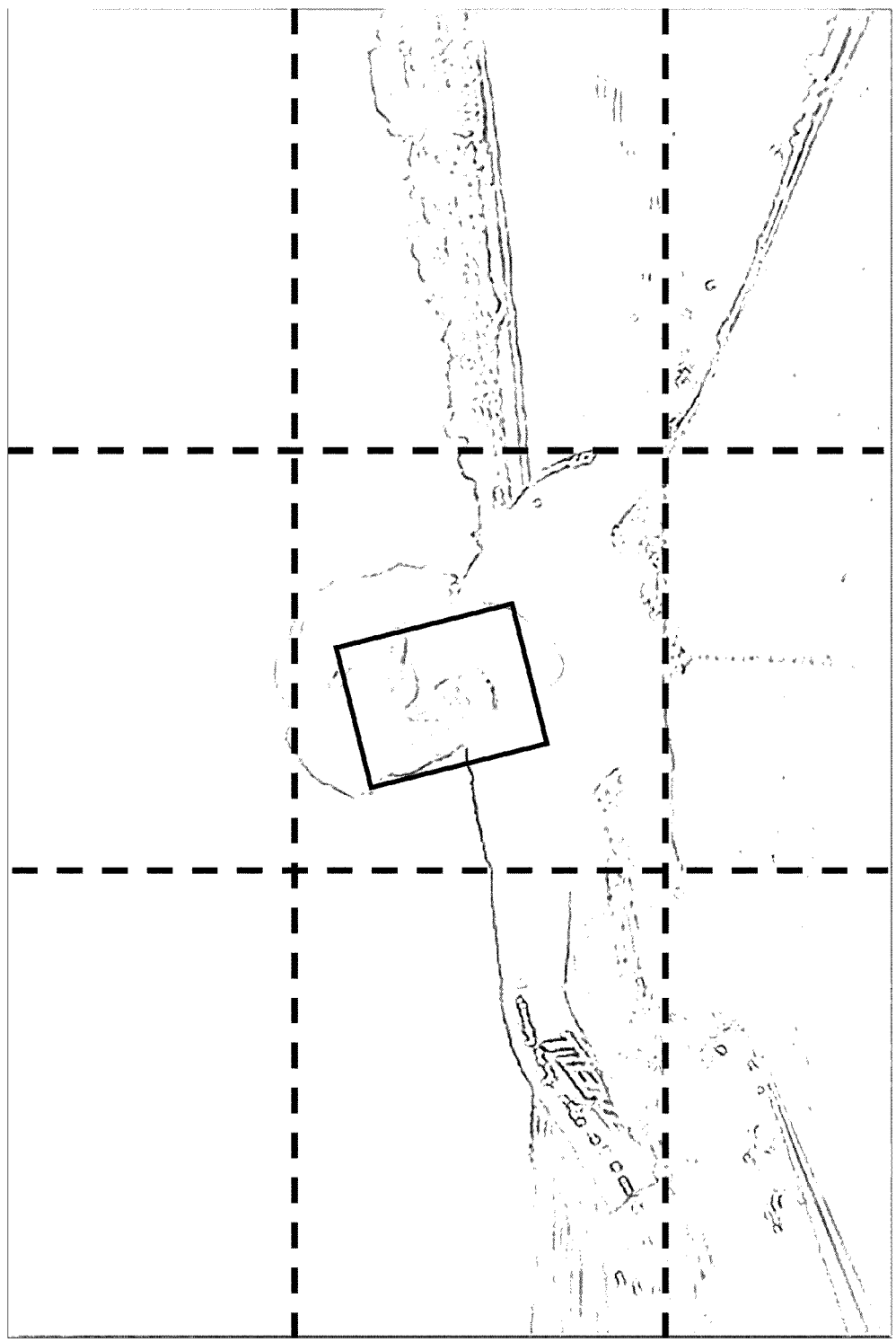
Figure 17:
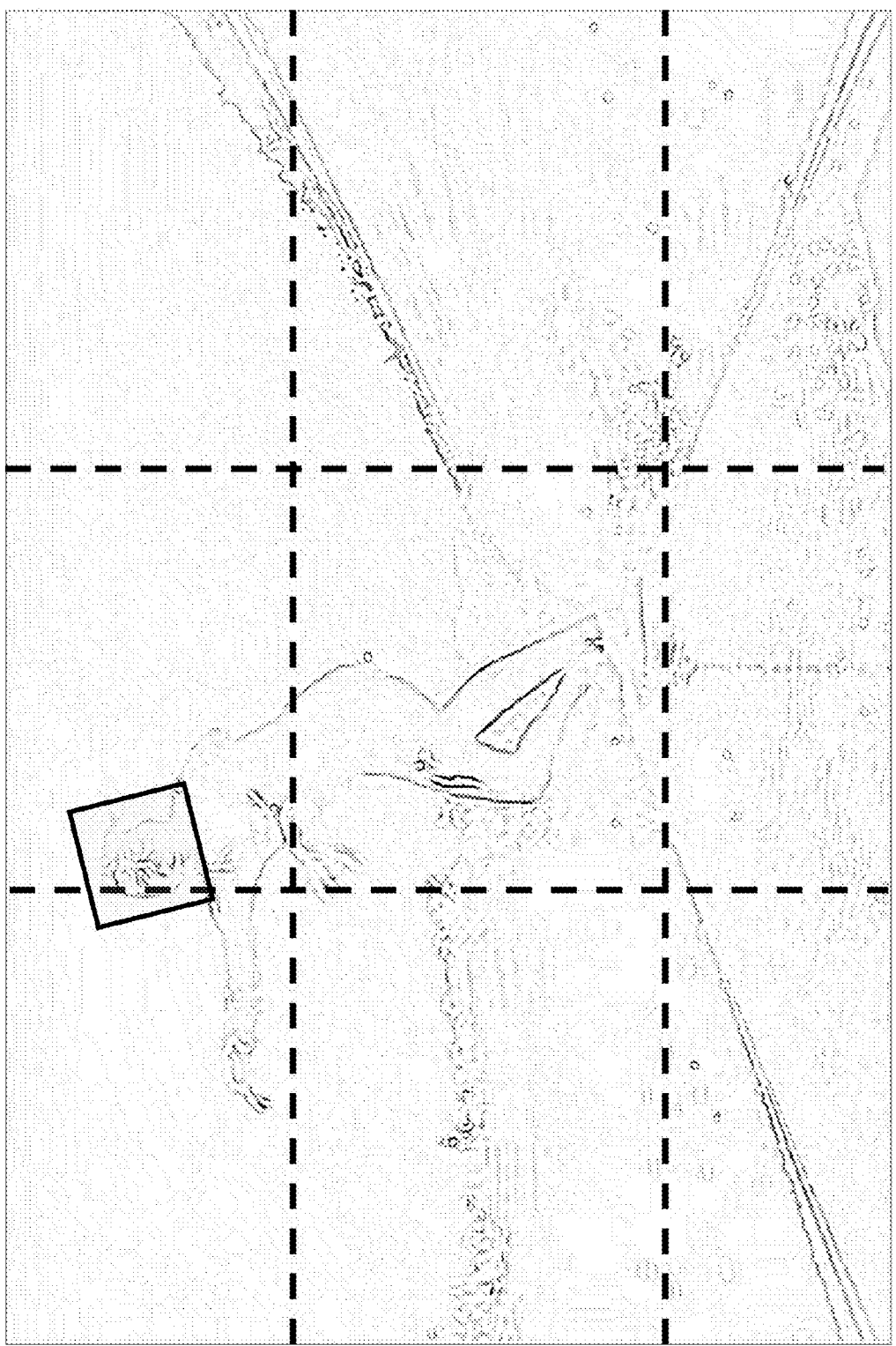
Figure 18:
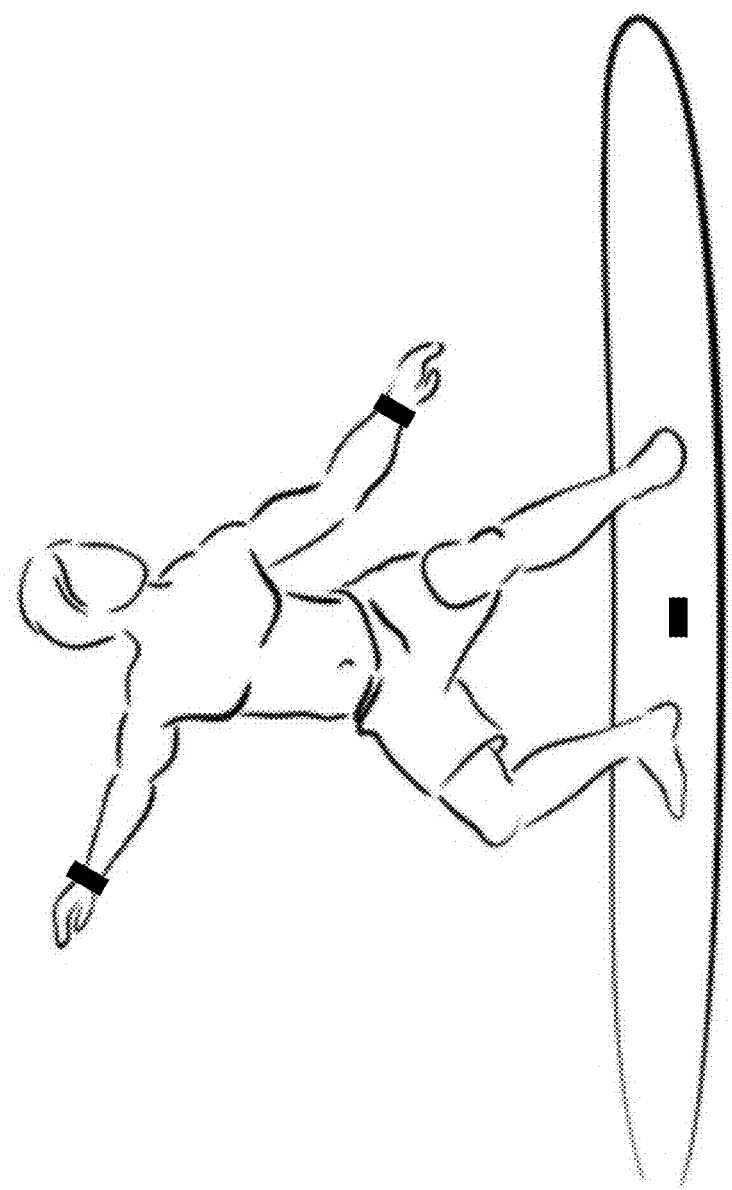
Figure 19:
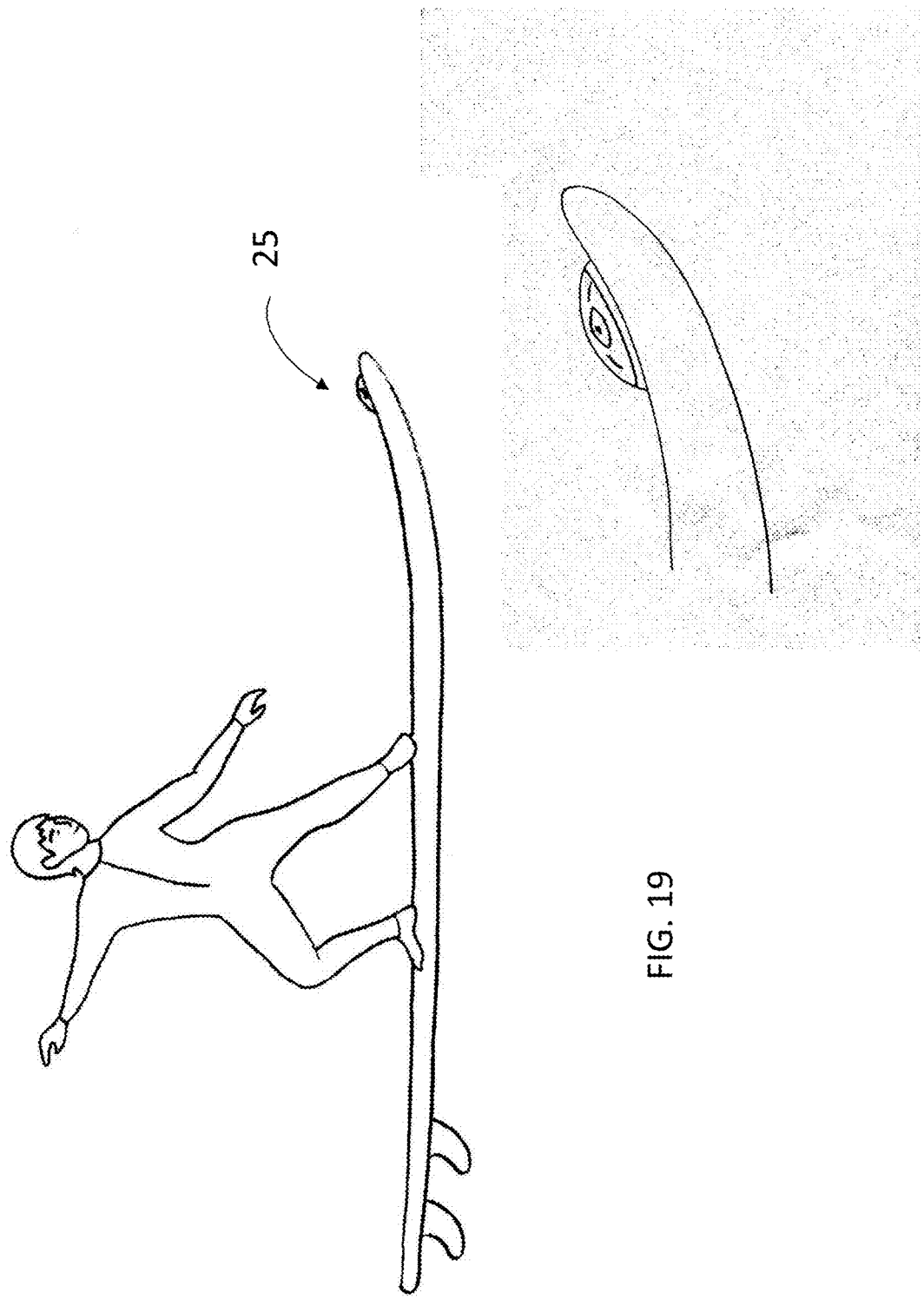
Figure 20:
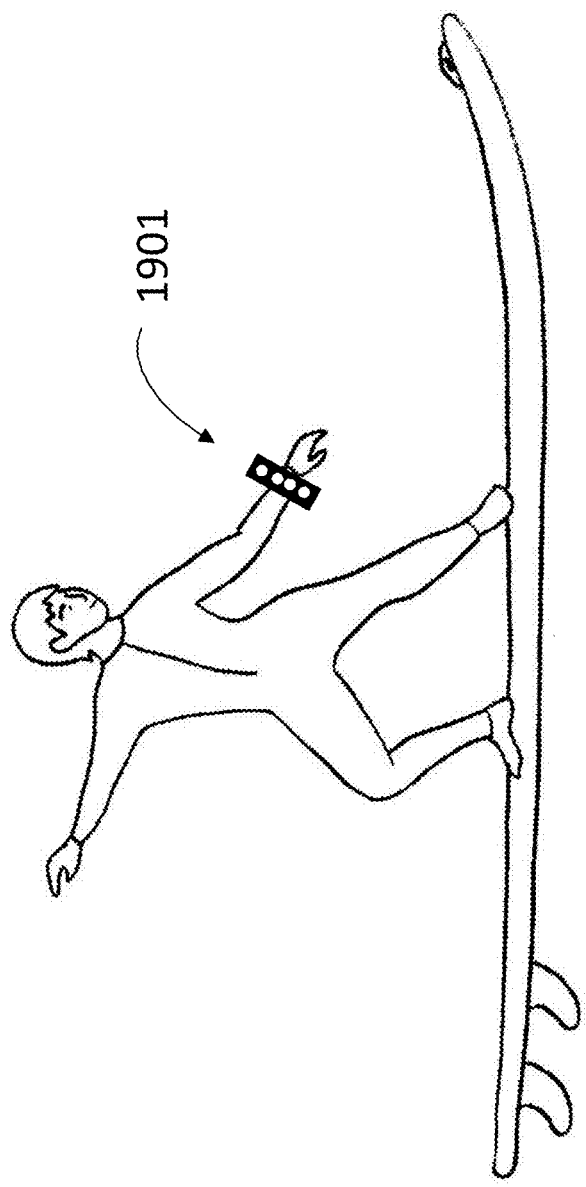

FIG. 1 is a schematic representation of surfer sitting.
FIG. 2 is a schematic representation of a surfer paddling.
FIG. 3 is a schematic illustration of a surfer doing a pop-up.
FIG. 4 is a schematic diagram of the test set-up.
FIG. 5 is a plot of accelerometer data from test set-up.
FIG. 6 is a plot of the gyroscopic data from the test set-up.
FIG. 7 is a plot of the gyroscopic data from the test set-up with offset.
FIG. 8 is a plot of gyroscopic data representative of a slow paddling cadence.
FIG. 9 is a plot of gyroscopic data representative of a medium paddling cadence.
FIG. 10 is a plot of gyroscopic data representative of a fast paddling cadence.
FIG. 11 is a plot of IMU data obtained during an example pop-up (first instance).
FIG. 12 is a plot of IMU data obtained during an example pop-up (second instance).
FIG. 13 is a plot of IMU data obtained during an example pop-up (third instance).
FIG. 14 is a plot of IMU data obtained from paddling during a surf session.
FIG. 15 is a schematic representation of a surfer with left arm entering the water.
FIG. 16 is a schematic representation of a surfer with right arm entering the water.
FIG. 17 is a schematic representation of the surfer riding the wave.
FIG. 18 is a schematic of the IMU-based system.
FIG. 19 is a schematic of the vision-based system.
FIG. 20 is a schematic illustration of a combined system.

DESCRIPTION OF INVENTION

Motor Control refers broadly to the control of the mechanical or electrical systems associated with an activity of interest. Motor control can include adding assistance to the activity, making the activity easier to complete, or actively stopping the activity.

Activity Associated Movement Signals refers to signals, movements, images, or information that are related to the participation in the activity of interest and are used for motor control. These motions are part of and inherent to the activity of interest. For example, in motor assisted surfing such an activity associated movement signal includes the act of paddling where the degree of assistance is proportional to the arm cadence.

Activity State refers to the general activity of the participant as it relates to motion differences. For example, surfing is the general activity but is composed of the following activity states: paddling, pop-up, standing, sitting, duck-diving and being off the board.

Gesture Control Signal refers to signals, movements, images, or information that are generated with the purpose of facilitating motor control. For example, in motor assisted surfing such a gesture control signal can be the raising of one's arm with the thumb pointing up to signal the desire for more power to the motor.

Environmental Noise refers broadly to signals, movements, images, or information that are not related to participation in the specific activity of interest. These noise sources or artifacts add complexity to the system and must be managed effectively. For example, the general swells, waves in the ocean, or other surfers all represent examples of Environmental noise.

Non-Activity Movement Noise refers to movements by the individual that are unrelated to the activity of interest. For example, such motions when surfing can be associated with removing hair from the face and cleaning kelp from the surfboard leash.

Activity Sequence Logic relates broadly to use of necessary prior activities or states to facilitate motor control. For example, the surfer must be located on the board before motor assistance should be activated. Arm motions associated with swimming should not trigger activation of the motor if the surfer has not completed the necessary activity of getting on the board.

State Determination refers to the determination of the participant's activity state with additional specificity. For example, when doing stand-up paddle boarding, the activity is stand-up paddle boarding, the activity state is paddling and the state determination is left handed paddling. Such information can be used to add a greater degree of assistance based upon physical characteristics of the participant.

A 3D camera refers broadly to any imaging system that captures distance information in conjunction with image information. These include range cameras, a device which produces a 2D image showing the distance to points in a scene from a specific point and stereo cameras, a type of camera with two or more lenses with separate image sensors or film frames for each lens, which allows the camera to simulate human binocular vision, and therefore capture three-dimensional images.

Cadence Based Self-Propulsion Activities encompasses any activity where the user exerts effort to initiate propulsion and the experience could be enhanced by motor assistance but does not include bicycling. Activities can include but are not limited to surfing, standup paddle board, canoeing, kayaking, skate boarding, scootering, and inline skating.

Activity cadence is the rate of performing a repeatable activity such a paddling. The rate can be variable but is defined as a metric that increases with increasing cadence rate.

Hands Free Operation defines a use case where the participant is not required to adjust the amount of motor assistance by using a throttle type control device. Because most of the above activities require the use of hands, using hands for paddling or using the hands for holding a paddle or a steering mechanism does not count in considering whether operation is hands free operation.

Example Embodiments

The example embodiments described herein create an enhanced user experience by providing a control mechanism for assistance that is based on movements inherent to the activity. The system does not alter or interfere in the participant's experience but rather enhances the activity by making it easier or more enjoyable. Unlike typical control mechanisms that may require adjustment of a throttle or a physical activity unrelated to participation in the activity, the present control system seamlessly captures the movements of participation and adds assistance based upon these movements. The procurement of the necessary data occurs via non-intrusive means to include simple watches, anklets, small IMUs located in paddles or a camera mounted to capture images of the participant. The implementation of such a system is complex and nuanced as the participant is moving through the environment and many noise artifacts are present. The invention makes use of novel developments associated with environmental noise management for the implementation of a safe and effective system. These concepts provide for improved performance relative to prior approaches by effectively managing various noise sources unrelated to the movements associated with the activity of interest.

Although there are multiple means to obtain movement information, the disclosure will use inertial measurement units and optical system as example embodiments. Those skilled in the art will appreciate other mechanisms to obtain movement information and will be able to readily incorporate those other mechanisms in the systems described herein.

Use and General Processing of IMU Data

The following section describes a system for determination of a participant's activities for the control of an assist motor by using information obtained from an inertial measurement unit, referred to herein as IMU data. The described method is generalizable to all assistance activities but will be described within the context of surfing. For illustration purposes, the process is articulated via a series of discrete steps but many variations are contemplated within the present invention. Specifically, the sequence of the steps can be changed as needed to facilitated effective processing.

Minimization of Environmental Noise

Environmental Noise can be reduced through a variety of methods. The inventors have discovered, and confirmed by testing, that environmental noise typically has a frequency content that is different than activity associated movement signals. Additionally, information can be combined from various sensors to minimize environmental noise. Using the surfing as the example activity, environmental noise is largely due to motion of the ocean such as swells and waves. These noise artifacts will have a lower frequency of change then most activities associated with surfing. For example, the typical swell takes several seconds to pass while the motion associated with paddle initiation is more rapid. Specifically, a large swell will create significant movement but the movement will have a lower frequency response than most surfer-initiated paddling or pop-up motions. Thus, frequency processing of the IMU date, specifically the accelerometer data, to reduce or ignore low frequency changes can result in environmental noise minimization.

The incorporation of additional sources of data can be used to cancel, minimize, or reduce environmental noise. One such strategy uses an accelerometer or IMU in or on the surf board. The accelerometer readings that are common to both the board and the surfer are likely due to the ocean and can be removed from the data used for determination of surfer activities. The removal of these artifacts will improve the performance of the system by elimination of a noise source. This type of common noise reduction can also be applied to sensors placed on the body of the surfer because paddling results in minimal motion of the torso relative to the magnitude of hand motion. Additionally, data for a right and left mounted data streams can be used to eliminate those environmental noise artifacts that are common to both data sets. Environmental noise management is an important and non trivial element in developing an effective motor control system, especially when using accelerometer data.

Identification of Non-Activity Movement Noise

In addition to environmental noise management, any activity can include movements that are not associated with the main activity and thus should not result in motor control activities. It is important that these motions are correctly identified because unintentional changes in the motor control level would be a major detriment to the participant experience. For example, a surfing getting the hair out of one's eyes or removing kelp from the leash are both intentional movements but not surf motions necessitating a change in motor control. Thus, an important data processing step is to effectively discriminate unrelated motions from surf gestures. The process can use one or multiple threshold levels on one or more sensor readings as well as the rate of change determination.

Determination of a non-activity movement versus an activity associated movement can be improved by looking at the response of two sensors and looking for repeat patterns. In surfing for example, if the sensors observe an activity in one arm but no motion in the other, the activity is likely a non-surf motion. In contrast, repeated motions in both arms would be highly indicative of a paddling motion. In skateboarding, motion on one leg might suggest a skating push off but the lack of similar motion in the other leg can be used to distinguish walking from skating. One of ordinary skill in the art will recognize that these various methods can be used independently or in combination for the effective determination of non-activity associated movement signals Determination of Activity State Determination of the activity state is based upon the use of activity associated signals and results in the general classification or identification of a given activity. Examples include paddling versus surfing versus sitting during surfing. FIG. 1 shows a typical position of a surfer "sitting" on the board. FIG. 2 shows a typical paddling motion, and FIG. 3 shows a typical pop-up. In practice, these activity movements are intentional, deterministic and repeatable but the lack of a start point or datum makes the process more difficult. In many activity recognition systems, the process begins with the hands or arm in a stationary location followed by the action or movement. Due to movement in the environmental and a non-zero starting location the problem addressed by the present invention is significantly more complex. Additional complexity also exists due to speed differences in activity, differences in the exact motion taken, differences in the size of the participant, and instrumentation differences. By using environmental noise reduction methods combined with supervised classification techniques, embodiments of the present invention can provide activity identification. The methods leverage the fact that the activities of interest are based upon repeated motions that are deterministic in nature. This type of information can be utilized to determine the activity type through supervised classification techniques. For the purposes of this disclosure, supervised classification techniques broadly refer to machine learning tasks of inferring a functional relationship based upon labeled training data. Supervised learning techniques can include, but are not limited to, decision trees, K nearest neighbors, linear regression, Bayes techniques, neural networks, logistic regression, support vector machines and relevance vector machines.

The information obtained can be pre-processed to facilitate proper activity determination. For example, in speech recognition the speed with which the words are spoken does not influence the meaning of the words. In many activities, the determination of the activity is dependent on the trajectory of movement and is independent of the rate of the speed of the motion. For example, paddling can be done slow or fast, while the typical pop-up occurs rapidly. Therefore, the recognition system can effectively identify the motion regardless of the motion speed.

One method useful in the present invention for accomplishing this task is dynamic time warping. Dynamic time warping is an algorithm for measuring the similarity between two temporal sequences which might vary in time or speed. A well-known application of dynamic time warping is automated speech recognition. The methodology helps the recognition algorithms cope with different speaking speeds. In practice, dynamic time warping calculates an optimal match between two given activities by nonlinearly "warping" the time dimension to determine a measure of similarity independent of the time dimension. A variety of other methods exist to minimize the influence of motion speed differences, but dynamic time warping is a common method.

Stage Determination

Stage determination represents a further refinement in determining the activity associated movement. Such refinements can define right from left arm stand-up paddling or other sub-determinations within the activity associated movements. Such determinations can leverage additional information such as a magnetometer as contained in a typical IMU. A magnetometer can be used to determine the general direction of travel by using the earth's magnetic field. Magnetometer information can be used to know if the surfer is paddling toward shore or away from shore. The ability to determine general board direction is valuable because the motor control response can be different depending upon the direction of travel. For example, when trying to catch a wave the response of the motor needs to be quite quick. In contrast, the response when paddling out can be slower to create a smoother transition and surf experience.

Cadence Determination

For motor control, the rate or intensity of an activity is often used as to determine the amount of motor assistance. In surfing, kayaking and stand-up paddle boarding, the motor assistance level can be proportional to paddling rate as well as the distance of stroke. When surfing, the arm stroke rate can be a good surrogate for the effort applied by the surfer. Thus, the use of proportional power based upon the cadence of the surfer is a reasonable basis for a control system that is both responsive to the needs of the surfer and intuitive to use.

Gesture Determination

The determination of gesture control signals for motor control adds an additional level of control and safety. Gesture recognition is the process of categorizing an intentional movement of the hand and/or arms to express a clear action. Sign language is an example of an intentional gesture that can be recognized. In the case of determining the type of motor control response desired, one can define a gesture and a corresponding motor response. The user of gesture communication can enhance overall operation by enabling additional assistance control during defined activities. Such gesture communication can also be used to stop the motor in defined conditions. For example, when surfing a wave, the participant might want additional assistance as the wave is "petering out" but due to shore conditions a second wave is available and the participant might want to "power" to the next wave. In such a condition, the participant can gesture communicate with the motor control system for more assistance by using motions like those uses when water skiing. As an analogy, in water skiing, the skier will communicate with the board driver via gestures to go faster or slower by the wave of an arm or the direction of a thumb. Similarly, the boat motor is cut when the skier makes a "cut" movement over their neck. Such simple gestures can be used to automatically perform motor control in the present invention.

In typical gesture recognition applications, the individual is not moving, the environmental surrounding the individual is stationary, and the gesture has a defined start and stop. Thus, the use application adds significant complexity to the gesture recognition process and represents an atypical application of the technology.

Processing Nuances Associated with IMU Data

Use of Surfer-Specific Information for Activity Determination

Accelerometer data can be used for activity recognition, but system performance can be improved if the system is trained to compensate for participant-to-participant differences and environmental noise is minimized. In a typical recognition system development, the algorithms used will be developed from data obtained from a variety of participants. Such a data set can include male and female participants, participants of different skill levels, and participants of different sizes, because accelerometer data will be in influenced by these participant-to-participant differences. As a simple example, consider two surfers paddling at 1 stroke per second. The accelerations at the wrist for the longer-armed surfer can be higher than the short-armed surfer who is paddling with the same cadence. Thus, surfer-to-surfer differences that create variances or differences unrelated to the surfing actives can degrade system performance.

To demonstrate this difference in accelerometer magnitude, a simple test was conducted. A yardstick was attached to a variable speed motor and two IMU devices were located on the yardstick at 34 and 24 inches from the rotation point. A schematic of the experimental setup is shown in FIG. 4. The distances of the IMUs from the point of rotation simulate arm lengths consistent with the arms of smaller and larger surfers. The system was started and a rate of rotation mimicking a surfer's paddling motion obtained. The resulting data was recorded and the magnitude of acceleration determined by taking the vector sum of the acceleration components in x, y and z. Examination of FIG. 5 shows the difference in the accelerometer magnitudes between the IMUs at different lengths. Thus, different length arms will result in magnitude differences. Magnitude differences can be problematic based upon the recognition system used. For example, it the system uses an accelerometer threshold, activity recognition errors could occur. Additionally, a direct pattern based comparison using both magnitude and frequency will have degraded performance due to magnitude differences. Such surfer-specific differences can be mitigated by using the training procedures described below.

The system can use participant-specific training information to normalize or compensate for participant-to-participant differences. The training of the system is the process of using participant-specific information to improve the performance of the surf activity recognition method, as well as determine the motor assistance during paddling. An accelerometer-based system can be trained via three related approaches.

A first approach is a general model approach where the system is trained to recognize motions that are common to all participants followed by a participant-specific normalization or compensation step. This training step involves entering subject-specific information. For example, participant-specific training information can include the participant's height or arm span, as well as foot position on the board (e.g., goofy or regular) or right handed versus left handed. The resulting participant-specific information is then used to compensate for differences that influence the accelerometer measurements for improved system performance. By way of analogy, this process is related to the set-up process with speech recognition systems. Most systems require the user to enter the language being used. This information about the user helps the speech recognition system perform better.

A second training method involves training the system for a given individual, effectively creating a participant-specific training. The process can entail having the owner of the system surf one or more times so the motion characteristics of that individual are effectively captured. Such a process might be useful with those that have non-standard surf motions. Examples of non-standard surf motions include a two-armed synchronous paddling motion, or a one-armed paddling motion.

A third method is a combination system involving the two prior methods. The system has a general recognition model installed on the system but the model is improved over time by using participant-specific information. The methods can be updated and improved over time based upon the individual participant's characteristics. This method is analagous to algorithm updating methods used in speech recognition systems on the iPhone and Dragon speech recognition systems.

Gyroscopic Data for Cadence Determination

Gyroscopic sensors measure angular velocity. The units of angular velocity are measured in degrees per second (°/s) or revolutions per second (RPS). Because a gyroscope measures rotational velocity, the system is largely insensitive to arm size. Returning to the example of the long and short armed surfers paddling at 1 stroke per minute, the resulting gyroscopic signal would be similar. Thus, surfer-specific compensation issues associated with gyroscopic data are decreased due to the fundamentals of the measurement. Additionally, the rate of paddling cadence is directly rated to the angular velocity of the arm as measured by the gyroscope. The use of gyroscopic data can be an important element of the system because the data is less sensitive to environmental noise due to the fundamental nature of the measurement.

Using the same test set-up described previously, gyroscopic data was obtained. The magnitude of the gyroscopic data was determined and is plotted in FIG. 6. Examination of the figure shows complete agreement between the measured values. FIG. 7 shows the same information as FIG. 6 but an offset of 300 counts was added to facilitate better visualization. Thus, as demonstrated by the test set-up, the gyroscopic data is not sensitive to arm length differences.

Sequential Logic

The system can also use sequential logic regarding the time sequence of events. For example, in surfing, a sitting position can not be followed by a pop-up activity because the surfer must paddle before the pop-up can occur. Additionally the sequence can be used to define state or awareness of the system. For example, when paddling out from shore the system response can be sluggish and the data transfer rate potentially slower. However, when the surfer turns the board to point toward shore, moves to the paddling position and starts paddling, the system can be in high response mode. The system needs to sense and respond to cadence differences and stop motor assistance if a halt activity is initiated. The halt activity occurs when one starts to paddle into a wave but realizes that another surfer has priority on the wave. Failure to halt results in a drop-in and a dangerous situation. Thus, the sequence of events preceding an activity can be used to determine a rapid response.

Use and General Processing of Image Data

As an alternative or combined approach, visual information regarding the participant's activity can be used for motor control. When processing the visual information, the general goals and objectives are the same as the IMU data but the use of visual data content requires some alterations. In the following sections, information and details on how to process visual information collected from several types of optical systems will be discussed.

For the purposes of motor control, visual activity recognition in a moving environmental creates many complexities and standard visual processing methods work poorly. The enclosed invention addresses these complexities through a series of novel combination of processing and data procurement methodologies.

Standard Camera Systems

The system can be implemented using a variety of vision capture technologies including both video and still cameras with the ability to rapidly capture images. Infrared cameras can also be applicable. Additionally, the system can utilize a fisheye lens to completely capture the environment. A fisheye lens is an ultra wide-angle lens that produces visual distortion. Fisheye lenses achieve extremely wide angles of view by forgoing producing images with straight lines of perspective (rectilinear images), opting instead for a special mapping (for example: equisolid angle), which gives images a characteristic convex non-rectilinear appearance. Varying degrees of fisheye distortion can be used. For example, a contemporary GoPro camera has some visual distortion.

The actions of the participant can be determined using a conventional video system located so that the movements of the participant can be observed. The resulting images or image sequences can be processed for determination of activity associated movement signals. Vision-based activity recognition is the process of labeling video information containing human motion with action or activity labels. For example, an action can be decomposed into action primitives, that are aggregated to create an action, which is combined to create a possibly cyclic, whole-body movement referred to as an activity. For example, "left leg forward" is an action primitive, whereas "running" is an action. "Jumping hurdles" is an activity that contains starting, jumping and running actions.

Another method for processing visual images is optical flow. Optical flow is the distribution of the apparent velocities of objects in an image. By estimating optical flow between video frames, you can measure the velocities of objects in the video. The resulting descriptor based upon optical flow vectors can be used in conjunction with multi-class support vector machine for activity recognition.

The application of conventional activity recognition methods to a moving environmental is challenging due to environmental noise. In processing video obtained during the act of surfing, environmental noise is a significant issue due to lack of a non-moving reference within the visual field. For example, (1) the horizon rocks as a function of waves and the paddling motion, (2) the surfer moves on the board relative to the camera during all activities, and (3) the background changes due to direction of the board, other surfers and swells/waves. Most visual processing tools interpret the motion of an object relative to a fixed environmental, like a person walking on the street. The buildings are stationary and the person moves in the environmental. In many use scenarios of the present invention, the scene is not stationary creating a more complex processing environment.

These nuances can be minimized by utilizing different processing methodologies to minimize or correct for environmental noise. Techniques used include 1) horizon detection, to determine the angle of the board in the water, 2) face or upper body detection, to determine the location of the body centerline, 3) image masking, based on spatial or spectral features, to limit analysis to the arms during paddling, and 4) comparative/differential regional analyses, to identify and remove movements common to both arms during paddling In testing, the use of a camera with stabilization features is of significant benefit. Stabilization can be provided by multiple methods but most are based upon the use of gimbal mounts. These systems enable the recording of visual information that is smooth, without shaking effects, and maintains a constant horizon. The stabilization of the camera system reduces unwanted environmental noise and facilitates activity recognition.

Another method is to use a camera with a limited depth of focus. Depth of focus is defined as the distance between the two extreme axial points behind a lens at which an image is judged to be in focus. The use of a limited depth of focus camera specifies that only objects within a defined distance will be in focus. The result is a bokeh image where the subject is in focus and the background is blurred. As the participant of the activity is the critical object and one seeks to minimize environmental noise, a depth of focus specific for the participant is useful. In practice, the participant is in focus while other objects within the image field are blurry. No-reference image quality measures can be utilized to effectively determine the degree of blur using information derived from the power spectrum of the Fourier transform. Other methods include the use of the Haar wavelet (HAAR), modified Haar using singular value decomposition (SVD), and intentional blurring pixel difference (IBD) for blur detection. These methods and related methods can be used to effectively remove the background information that is blurry due to the use of a limited depth of field camera. These methods are typically used to sort the quality of images from a picture sequence used create a dimensional reconstruction of an object. Thus, the use these tools to remove background information, as in the present invention, is novel.

Several methods exist for the creation of bokeh images. Current technology smart phones with dual rear camera arrangements, one with a high-resolution camera coupled with a second typically low-resolution camera, can create bokeh images. The combination of the two cameras allows the system to create bokeh image. Other methods exist that include multiple images and masking effects.

3D Camera Systems

Environmental noise can be reduced by using a 3D camera. For the purposes of this description, a 3D camera is a broad term that includes any image system that captures distance information in conjunction with image information. Examples include range cameras, a device which produces a 2D image showing the distance to points in a environmental from a specific point and stereo cameras, a type of camera with two or more lenses with separate image sensors or film frame for each lens, which allows the camera to simulate human binocular vision, and therefore capture three-dimensional images. Examples of commercially available 3D cameras include the Microsoft Kinect, Orbbec Astra, Intel Realsense, Stereolabs Zeb stereo camera and others. In addition to these cameras, light field or depth maps can be created using a camera that takes images as different focal lengths and then post process the information to create a 3D image. These systems operate by different principles, but are able to capture distance information in conjunction with image information. Although these systems are typically used for distance determination, the information can be used for environmental noise reduction. The system can use image information from only a defined set of distances for determination of activity associated movement signals. In most activities, the camera will be mounted on the front of the object so that the participant is located between 12 and 36 inches away from the camera. Thus only image data obtained at distances between 12 and 36 inches is used for processing. This method effectively creates an information-less background of any location in the image plane that is greater than 36 inches away from the camera.

Although not used in situations where the environmental is moving, skeletal tracking for the creation of a skeleton stick figure can be performed. Skeleton tracking is the process of representing the participant in a stick figure configuration. Such a simple representation can be used to simplify calculations regarding position and cadence.

Face Detection

In addition to the use of vision-based activity recognition, face detection can be a valuable tool in the processing method. Although face detection is typically used for focusing applications, the invention can use face detection as both a safety mechanism and a control mechanism. If no face is present in the image, then the motor control will initiate an immediate stop because the participant is no longer on the device. In the case of surfing, it can be used to determine the position of the participant in a paddling position. Additionally, face detection can be used to determine when a "pop-up" to a standing position has occurred. This non-conventional use of face detection has significant value in creating a safe and functional system.

Motion Capture Systems

Motion capture system are typically used for computer graphic development for video games but can be repurposed into the activity determination for motor control in the present invention. An example system can be implemented using motion capture systems that use a camera in conjunction with markers placed on the participant. In practice, the participant can have wrist bands with retroreflective markers or other characteristics that are tracked by the camera. An extension of this technique can be to use optical-active techniques that use LED markers. Active or passive markers can be placed on the participant to facilitate cadence and location determination.

Attached Camera Systems

Determination of the location of an arm in space can be done via a camera and IMU system attached to the arm. Thus, unlike systems previously described, the camera is on the arm and observing the surrounding environment. The process integrates three types of functionality: (1) motion-tracking: using visual features of the environment, in combination with accelerometer and gyroscope data, to closely track the device's movements in space; (2) area learning: storing environment data in a map that can be re-used later; and (3) depth perception: detecting distances, sizes, and surfaces in the environment. Together, these generate data about the device in six degrees of freedom (3 axes of orientation plus 3 axes of motion) and enable the position of the device to be known in absolute coordinate space. Such information can be used to determine the movement activities of the participant and for the control of the assist system. Such a position sensor can, for example, be part of a surfer's watch and determine arm position changes, the direction of the board, and the rise and tilt of the board/surfer due to a wave. Such information can be used to ensure proper motor control and to ensure an enjoyable surfing experience.

Combination Systems

The above IMU and image based systems can be combined based upon cost, usability and convenience needs. The use of a wrist-based IMU in combination with a camera can create a system that provides accurate determination of activity motion. Depending upon the activity, such information can be used to determine arm rotation, leg push on a skateboard, and paddle cadence. As one can appreciate, a multitude of system combinations exist for effectively capturing participant activities so appropriate motor assistance can be provided.

Motor Control

As described above, the system can determine the motions of the participant so motor assistance can be initiated based upon the natural or inherent motions of the activity. The system also provides for refinements beyond a binary on-off motor control. Such an on-off control can be used but can create an undesired user experience. Thus, the level of assistance as a continuous function should be defined by the participant's natural actions. The amount of assistance can be proportional to the speed or cadence of the paddling motion. For example, when surfing the paddle out from shore will typically have a lower cadence so the level of motor assistance can be less. Additionally, the response time of the motor control unit can be less because the process is relatively constant. However, when trying to catch a wave the level of assistance can be higher if the surfer is paddling aggressively and the ramp to full power can be faster. Thus, the maximum assistance level can be different and the overall response time of the system can be less. At the point the surfer catches the wave, the activity recognition system can recognize the change in position and the motor can be turned off, maintained, or slowed depending upon surfer preference. At the point the surfer dismounts the board or returns to a seated position the motor can stop.

In kayaking, the level of assistance can be defined by the cadence of the paddling motion. In stand-up paddle board or canoeing, the level of assistance can be proportional to the stroke rate. In stake boarding the level of assistance can be proportional to the kick rate of the participant. Additionally, the level of assistance can be adjusted based upon the size of the participant or the size of the device used. A large participant will likely require more power than a smaller participant. The level of assistance can also be controlled by the use of gesture control signals. For example a "thumbs up" signal can be used to increase the degree of motor assistance. The control system can also use verbal commands. Embodiments of the present invention thus provide hands free control systems that are based upon the movements inherent to the activity of interest with additional gesture and voice control.

In use, the exact levels of assistance can be user-defined based upon user preferences. For example, the level of assistance desired with a long board in bigger surf might be significantly higher than the level needed when the wave sets are far apart and small.

System Demonstration

Use of Inertial Measurement Data for Determination of Surf Activities

To demonstrate the application of the invention, an individual was configured with IMUs on both wrists. An experienced surfer went through the characteristic motions of surfing on a surfboard in the laboratory when the board was elevated on a bench so a natural paddling motion could occur. The surfer performed the following activities: paddling at different cadences and performing several pop-ups. In an effort to create easily visualized data, the surfer stopped paddling before implementing the pop-up. FIG. 8 is a plot of the gyroscopic data obtained for the slow paddling activity. The y-axis gyroscope channel is plotted. As a gyroscope measures rotational velocity, it is a sensing system well suited for measuring the rotation of the arm. FIG. 9 and FIG. 10 show the same information but at faster paddling rates. Examination of all three figures shows the ability to estimate cadence via the use of a wrist-based gyroscope.

FIG. 11 is the IMU data obtained from the first pop-up. Two additional pop-ups are shown in FIG. 12 and FIG. 13. Examination of the gyroscopic data, specifically the Y-axis and the Z-axis, show a distinctive relationship during the pop-up maneuver. The Y-axis has a significant positive excursion while the Z-axis has a distinctive deflection but of lower magnitude. Examination of the accelerometer data reveals a number of deflections from baseline but the identification of a common "signature" across the three pop-ups is difficult. In summary, the testing demonstrated the ability to determine cadence from the gyroscopic data and the ability to identify a pop-up signature from the gyroscopic data. Based upon the inventor's experience in activity recognition, the effective utilization of all the data from the IMU will result in a robust system for motor control.

FIG. 14 shows a segment of IMU data from a sensor on the right wrist during a surf session in the Pacific Ocean. In this segment, the surfer paddled five times with the right arm, rested briefly, then paddled for six additional strokes. Comparing data between accelerometers (left column), gyroscopes (middle column) and magnetometers (right column), it is apparent that cadence determination is substantially easier with gyroscope and magnetometer sensors. Gyroscopes and magnetometers are more sensitive to the relatively slow changes in angular velocity and angular position that are inherent to the paddling motion. Paddling can be detected in the accelerometer as well (particularly the Y-component), however the accelerometer is much more sensitive to high frequency noise in the body movement and "water chop" that degrade the ability to cleanly identify each stroke and the cadence in general.

Use of Visual Data for Determination of Surf Activities

To demonstrate the invention, a GoPro video of a surf session was obtained. Several images were captured from the video to demonstrate aspects of the invention. To facilitate representation in the application, the color images were processed using edge detection algorithms and converted into black and white images. Face detection was performed on the images processed and is shown by the solid black box. A simple paddle detection system can divide the image into nine panels as shown in FIG. 15. The two vertical lines are effectively the width of the surf board when the surfer is laying down. The lower horizontal line defines the top of the surf board. The upper horizontal line defines an upper limit where the face should be located when paddling. As paddling is one of the first activities, this location can be defined based upon initial images or based upon the surfer size.

The location of a face in panel 5 is consistent with paddling, see FIG. 14. Panels 4 and 6 can be examined for the identification of a moving object using efficient optic flow algorithms. Motion detected via optic flow can be corrected for environmental noise by subtracting or regressing out motion signals determined in other panels. Alternatively, paddling motion can be inferred based on the presence of absence of arms in panels 4 and 6. Similar to face and upper body detectors, arm and hand detectors can be trained to report the likelihood that and arm/hand is present or absent in each panel for each frame. The presence of an arm in Panel 6 with the concurrent lack of an arm form in Panel 4 is highly suggestive of a left arm paddling motion. The above example is a simplistic representation of the process but is provided as an illustrative example.

FIG. 16 is an example where the face is again present in the middle of panel 5, and the arm is present in panel 4. The cadence of the paddling motion can be determined by the time difference between detection of the right and left arms.

FIG. 17 shows the results of the same processing method but where the surfer has successfully caught a wave and is surfing. The face detection algorithm now detects a smaller face due to increased distance from the camera. Additionally, the height of the face above the board has increased and is above the highest horizontal line. Note, due to the activity of surfing, the surfer might look to the right or left such that no face is detected immediately. Thus, the absence of a face in panel in Panel 5 but a significant object above can be used for detection of surfing.

Although not shown, the lack of a human object on the board is indicative of the fact that the surfer has fallen off the board.

Example Embodiments

The motor control system for the various activities can be implemented in multiple ways. For simplicity of presentation, a surfing example will be used and two general approaches presented. In a first example embodiment, the IMU and the processing elements are resident in a device on the surfer's wrist or wrists. For example, an Apple watch with a surfer motor control app can be used because the device has an IMU, display system, and communication capabilities. Such a device can communicate the level of motor control to the motor.

In a second example embodiment, the IMU system simply communicates the information to the motor control system. The systems located on the surfer provide information to the motor control unit and the control unit processes the information for motor control. The above system can also benefit from an IMU located on the board as described previously.

IMU System Example

FIG. 18 is an example illustration of the IMU-based system with two IMU units on the surfer's wrists and a third unit on the board. The use of three IMU units creates three data streams of information, however a single wrist unit can be adequate. The information can be transmitted to the board via conventional Bluetooth technology to an antenna located in the front of the board. Additional robustness in communication might be desired for the system to work effectively in the water. For example, WFS Technologies has developed a wireless system for use in the ocean, known as the Seatooth® technology. The resulting information is communicated to a motor control unit (not shown) that the interfaces with the motor.

In an alternative embodiment, a Bluetooth receiver, optionally including an IMU, can be located on the ankle of the surfer. This configuration has several advantages as the communication between the surfer and the board can be though the surf leash thus eliminating transmission problems through water. Data connection between the wrist units and the ankle unit can be used as a safety stop mechanism. The motor should not be activated if the surfer's ankle is under water. Such a condition would be consistent with the surfer having fallen off the board or a situation where the surfer is sitting on the board. Thus, this example illustrates that the lack of a Bluetooth data communication can be used as a safety mechanism.

Camera System Example

As shown in FIG. 19, the board is equipped with a camera or video on the board so that visual information can be obtained. The camera can be any of a variety of different types as discussed earlier. The video information is communicated to the image processing system (not shown) and subsequently to the motor control system (not shown). In the example shown the camera is located at the front of the board but other locations are possible.

Combined System Example

For illustration purposes, FIG. 20 is an example of combined system that includes a camera mounted in or on the board and a wrist-based device on the surfer. The system is based upon a motion tracking system that use both cameras and attached systems on the individual being tracked. The camera used has detection sensitivities beyond the visible for improved motion tracking. The system combines face detection with elements of motion tracking. The system can determine general body position based upon face detection methods and location of the face in the camera frame. The surfer can wear a simple wrist band that contains infrared LEDs, 1901, (enlarged for better visualization). The band can contain different wavelength LEDs or different encoding frequencies (on-off rates) that provide information regarding the actual location of the surfer's wrist. For example, the LEDs on the top of the wrist CAN be activated at 20 HZ while the LEDs on the side are activated at 30 HZ. The camera-LED system is effectively a motion tracking system based upon an active optical system for cadence determination.

As one can appreciate, multiple systems that combine visual data with IMU data are possible. These systems can create the needed information for motor control to provide an enhanced surfing experience.

The control systems, motor control systems, and activity determination systems described can be implemented using any of several processing approaches, in computing hardware and software, known to those skilled in the art. As examples, contemporary smart watches can be programmed to implement the functions described. General purpose computing systems can be used. Special purpose processing hardware can be used, as well as specialty controllers used in control systems for industrial and other applications.

Although surfing has been used as a demonstration example, those skilled in the art will recognize that the present invention can be manifested in a variety of forms other than the specific embodiments described and contemplated herein. Accordingly, departures in form and detail can be made without departing from the scope and spirit of the present invention as described in the appended claims.

The invention claimed is:

1. A method of controlling an amount of motor assistance provided to a participant in an activity characterized by motions of the participant that are inherent to the activity, comprising:
   acquiring motion information concerning motion of the participant;

determining a type of activity from the acquired information;

determining a measure of activity cadence from the acquired information;

determining an amount of motor assistance to provide from the type of activity and from the measure of activity cadence; and providing motor assistance according to the amount of motor assistance determined in the preceding step.

2. The method of claim 1, wherein acquiring motion information comprises using one or more sensors attached to the participant.

3. The method of claim 1, wherein acquiring motion information comprises using an image capture system.

4. The method of claim 1, wherein determining a type of activity comprises reducing the contribution of environmental information that is not indicative of the activity type to the determination.

5. The method of claim 1 wherein the motor assistance comprises a state of a motor and an energy output of the motor, and wherein the state of the motor is determined from the type of activity and the energy output of the motor is determined from the measure of activity cadence.

6. The method of claim 2, wherein the one or more attached sensors comprise an accelerometer.

7. The method of claim 2, wherein the one or more attached sensors comprise an accelerometer and a gyroscope.

8. The method of claim 2, wherein the one or more attached sensors comprise an inertia measurement device.

9. The method of claim 3 wherein the image capture system comprises a video camera.

10. The method of claim 3 wherein the image capture system comprises a 3D camera.

11. The method of claim 4 wherein reducing the contribution of environmental information comprises frequency-based processing of the acquired information.

12. The method of claim 4 wherein reducing the contribution of environmental information comprises using information from multiple sensors attached to the participant, to an implement used by the participant in the activity, or both.

13. The method of claim 4 wherein reducing the contribution of environmental information comprises processing image data and detects the shape of an object of interest in the image data.

14. The method of claim 4 wherein reducing the contribution of environmental information comprises using a region of the image in focus for subsequent determinations using image data.

15. The method of claim 4 wherein reducing the contribution of environmental information comprises using the distance from the camera as an indicator in subsequent determinations using image data.

16. An apparatus for controlling the amount of motor assistance during a cadence-based self-propulsion activity based upon the inherent movements of a participant using an apparatus having a motor assistance feature, comprising:

a participant-attached sensor system configured to measure one or more movements of the participant;

a system configured to determine activity associated movement signals;

a system configured to determine a current activity of the participant and a cadence of a propulsion motion of the participant from the activity associated movement signals, and to control the amount of motor control provided based on the determines current activity of the participant and cadence of a propulsion motion of the participant.

17. A system as in claim 16, further comprising a gesture recognition system, and wherein the control of the amount of motor control is further based on the gesture recognition system.

18. A system as in claim 16, further comprising a voice command recognition system, and wherein the control of the amount of motor control is further based on the voice command recognition system.

19. A system for hands free operation of a motor control system of an apparatus for cadence-based self-propulsion activities based upon the activity cadence of the participant, comprising:

a sensor system attached to the participant, the apparatus, or a combination thereof;

an analysis system configured to determine a cadence of the participant's self-propulsion activity from the output of the sensor system;

a control system configured to determine a motor control signal based upon the determined cadence.

20. A system as in claim 19, wherein the sensor system comprises an accelerometer attached to the participant, the apparatus, or both; and a gyroscopic sensor attached to the participant, the apparatus, or both.

21. A system as in claim 19, wherein the sensor system comprises an optical system attached to the participant, the apparatus, or both.

22. A method of controlling an amount of motor assistance provided to a participant in a cadence based self-propulsion activity, comprising:

(a) acquiring activity associated movement signals from motions of the participant that are inherent to the activity;

(b) determining an activity state from the acquired activity associated movement signals;

(c) determining a measure of activity cadence from the acquired activity associated movement signals;

(d) determining the amount of motor assistance to provide from the activity state and from the measure of activity cadence; and (e) providing motor assistance according to the amount of motor assistance determined in the preceding step.

* * * * *